United States Patent [19]
Sankrithi et al.

[11] Patent Number: 6,152,400
[45] Date of Patent: Nov. 28, 2000

[54] AIRCRAFT LOWER LOBE SLEEPING COMPARTMENT

[75] Inventors: Mithra M. K. V. Sankrithi, Seattle; Marlyn E. Kyle, Arlington, both of Wash.

[73] Assignee: The Boeing Company, Seattle, Wash.

[21] Appl. No.: 09/144,405

[22] Filed: Aug. 31, 1998

Related U.S. Application Data

[60] Provisional application No. 60/058,331, Sep. 10, 1997.

[51] Int. Cl.⁷ .............................. B64D 11/00; B64D 11/06
[52] U.S. Cl. .................................. 244/118.5; 244/118.6; 5/118; 105/315; 105/316
[58] Field of Search .............................. 244/118.5, 118.6; 5/118; 105/314, 315, 316, 344, 345

[56] References Cited

U.S. PATENT DOCUMENTS

| | | |
|---|---|---|
| 2,092,655 | 9/1937 | Page, Jr. . |
| 2,124,003 | 7/1938 | McDonnell, Jr. et al. . |
| 2,280,065 | 4/1942 | De Roode . |
| 2,310,573 | 2/1943 | Burton . |
| 3,898,704 | 8/1975 | Gallaher et al. . |
| 4,022,404 | 5/1977 | Greiss . |
| 4,055,317 | 10/1977 | Greiss . |
| 4,066,227 | 1/1978 | Buchsel . |
| 4,071,210 | 1/1978 | Mutke . |

(List continued on next page.)

FOREIGN PATENT DOCUMENTS

| | | |
|---|---|---|
| 0 035 955 | 2/1981 | European Pat. Off. . |
| 0 035 955 A2 | 9/1981 | European Pat. Off. . |
| 0 514 650 A1 | 11/1992 | European Pat. Off. . |
| 0 681 956 | 11/1995 | European Pat. Off. . |
| 1002271 | 3/1952 | France . |
| 3007733 | 2/1980 | Germany . |
| 4116524 | 5/1991 | Germany . |
| 596 257 | 12/1947 | United Kingdom . |

OTHER PUBLICATIONS

"A340 Cabin Offers New Levels of Comfort for Passenger and Crew", *Aircraft Engineering*, vol. 63, No. 12, pp. 2–4, Dec. 1, 1991.
Flight Structures Inc., "747 Door 4 Overhead Crew Rest," publication date uknown.
The Boeing Company, "747–400 Overhead Crew Rest, Door 5," publication date unknown.
McDonnell Douglas, "Skybunk," publication date unknown.
*Air Transport World*, Nov. 1995 p. 39.
Schulz et al., "Lower Deck Module for Flexible Alternative Use of the Lower Deck of a Jumbo Jet," publication date unknown.
Bruce Smith, "Douglas Plans Shorter, Double–Deck MD–12," *Aviation Week*, Apr. 1992.
*Aviation Week*, "Airbus Studies Stretched Version of A330 With Dual Deck Configuration," Mar. 1990.
*Aviation Week*, "Airbus, MBB Define Cargo Hold Rest Area," p. 41, Oct. 1987.
*Aircraft Engineering*, "A340 Cabin Offers New Levels of Comfort for Passengers and Crew," Dec. 1991.

*Primary Examiner*—Michael J. Carone
*Assistant Examiner*—James S. Bergin
*Attorney, Agent, or Firm*—Christensen O'Connor Johnson Kindness PLLC

[57] ABSTRACT

Sleeping units such as bunks or cabins are arranged in a space efficient manner in the lower lobe of an aircraft, accessible from the main passenger cabin by a stairway or elevator. The space efficient arrangement of sleeping units can include bunks extending longitudinally along one side of a longitudinal aisle and bunks extending transversely of the aircraft at the other side of the aisle. Access to the transversely extending bunks can be by short cross-aisles. At least one portion of the passenger compartment can have a floor lowered relative to the normal cargo floor to provide additional headroom in the aisle, while another portion of the sleeping compartment can rest on the cargo floor for conversion between a passenger rest area configuration and a standard cargo carrying configuration.

11 Claims, 29 Drawing Sheets

U.S. PATENT DOCUMENTS

| | | |
|---|---|---|
| 4,397,432 | 8/1983 | Resetar . |
| 4,458,864 | 7/1984 | Colombo et al. . |
| 4,589,612 | 5/1986 | Halim . |
| 4,594,817 | 6/1986 | McLaren et al. . |
| 4,686,908 | 8/1987 | Legrand . |
| 4,726,550 | 2/1988 | Chen et al. . |
| 4,745,643 | 5/1988 | Clarke . |
| 4,925,132 | 5/1990 | Zider . |
| 5,106,036 | 4/1992 | Sepstrup . |
| 5,115,999 | 5/1992 | Buchsel et al. . |
| 5,129,597 | 7/1992 | Manthey et al. . |
| 5,205,515 | 4/1993 | Luria . |
| 5,314,143 | 5/1994 | Luria . |
| 5,383,629 | 1/1995 | Morgan . |
| 5,400,985 | 3/1995 | Banks . |
| 5,413,292 | 5/1995 | Luria . |
| 5,425,516 | 6/1995 | Daines . |
| 5,441,218 | 8/1995 | Mueller et al. . |
| 5,474,260 | 12/1995 | Schwertfeger et al. . |
| 5,526,999 | 6/1996 | Meston . |
| 5,687,929 | 11/1997 | Hart et al. . |
| 5,752,673 | 5/1998 | Schliwa et al. ............... 244/118.6 |
| 5,784,836 | 7/1998 | Ehrick ................................. 52/79.8 |

AIRCRAFT LOWER LOBE SLEEPING COMPARTMENT

This application claims the benefit of U. S. Provisional Application Ser. No. 60/058,331, filed on Sep. 10, 1997.

FIELD OF THE INVENTION

The present invention relates to a sleeping compartment for an aircraft and, more particularly, to a specialized sleeping compartment located in the lower lobe of an aircraft normally reserved for cargo or baggage.

BACKGROUND OF THE INVENTION

Modern commercial aircraft are designed for maximizing the dollar value of the payload, which can involve maximizing the passenger-carrying capacity. Nevertheless, tradeoffs must be made between such items as seat sizes and amenities to achieve maximized revenue. For example, a passenger cabin, or part of it, having roomier seats and more amenities may command a fare premium sufficient to justify the lesser number of passengers carried.

For many passenger aircraft of circular cross section, the main cabin floor is disposed somewhat below the geometric center to provide a large passenger compartment having the usual seating, overhead storage compartments, and other amenities. Ducts, cables, safety equipment, etc., can run through the small space at the top above the ceiling and overhead bins. The space below the cabin floor, substantially smaller than the cabin area itself, is designed for standardized cargo/baggage containers, as well as equipment bays, structural members, and auxiliary equipment. All in all, the goal is to provide a single, large, attractive passenger cabin with few encumbrances not directly associated with passenger comfort, such as galleys and lavatories.

Ultra-range subsonic airliners may have non-stop flights of a duration of 18 hours or more. On such long flights, it is necessary to provide room for pilot and attendant rest areas. In addition, on such long flights, cargo-carrying weight capability may be limited, such that the lower lobe (also known as the lower deck, lower hold, cargo deck, or cargo pit) remains at least partly unused. Thus, an aircraft configured for maximum commercial efficiency on a short route will not be configured for maximum commercial efficiency on a longer route, and vice versa.

SUMMARY OF THE INVENTION

The present invention provides a sleeping compartment in the lower lobe of an aircraft, such as an ultra-range subsonic passenger airliner. In the preferred embodiment, the lower lobe sleeping compartment, or at least part of it, is of a design for use by first class and/or business class travelers on long, non-stop flights, but part of the compartment can be configured for use by employees such as flight attendants and pilots. The user will dictate the amenities and safety equipment provided, which necessitates different floor plans and bunk or cabin designs depending on the intended users.

Access to the lower lobe sleeping compartment can be by elevator or by a stairway occupying a small amount of the space in the main cabin, to lessen the impact of providing the lower lobe sleeping compartment on the floor space available in the main cabin. Within the lower lobe compartment, a space-efficient arrangement of bunks, cabins, or other rest areas is provided. This can include modules which can be removed to be replaced by standardized baggage/cargo containers, i.e., the lower lobe sleeping compartment can be convertible between a first configuration with more storage/baggage capacity and fewer beds, and a second configuration with less baggage/cargo capacity and more beds.

In the case of at least part of the space being convertible between baggage/cargo areas and sleeping areas, it is desirable that no structural change be made to the aircraft frame so that standardized luggage/cargo containers can be substituted for sleeping compartment modules quickly and easily. However, limited headroom usually is available in the lower lobe, so that it is desirable that at least part of the sleeping compartment be provided with a lowered floor, at least in the area of long aisleways required for access to bunks, compartments, lavatories, or other lower lobe areas. Consequently, in one design, one portion of the lower lobe sleeping compartment adjacent to the cargo door has the usual horizontal cross-frame and floor, whereas the portion of the sleeping compartment substantially to the rear of the door has a lowered floor, at least in the area of any aisleways. In the rear portion with the lowered floor, the elevator or stairway can be located as a permanent fixture, along with other monuments such as a lavatory.

Some of the most space-efficient arrangements use top and bottom bunk units placed back-to-back and extending transversely of the aircraft, with a short aisleway between units. A long aisleway extends along the inner ends of the bunk units, with longitudinally extending top and bottom bunks along the opposite side of the aircraft. Preferably, as many of the bunk units as possible have a large side access entrance, which is more convenient for the user than an end access entrance.

Areas reserved for crew and pilots may be partitioned from areas provided for passengers, and may require different safety or convenience amenities or bed arrangements or density. Another possibility is the provision of private "cabins" which may have specially designed recliners convertible between seating positions with tables and video displays, semi-reclining positions, and fully reclining positions having substantially horizontal resting surfaces for sleeping.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
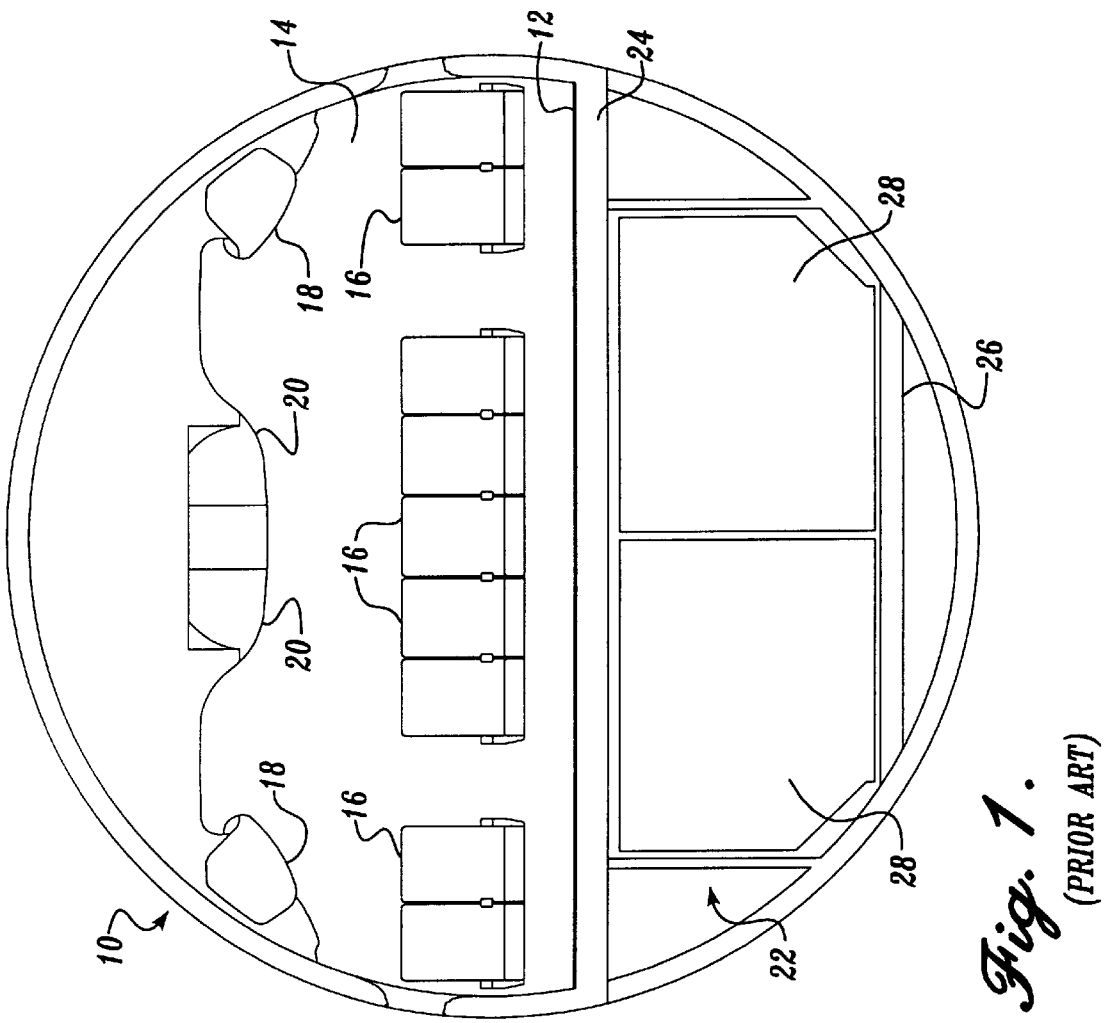
FIG. 1 (prior art) is a diagrammatic cross section of an aircraft of the type with which the present invention is intended to be used, such as a Boeing 777.

FIG. 1 shows a diagrammatic cross section of a representative aircraft of the type with which the lower lobe sleeping compartment in accordance with the present invention is intended to be used, in this case, a Boeing 777. For most of its length, the aircraft 10 is of circular cross section, a semimonocoque design having an outer skin supported on an inner peripheral frame. The main cabin floor 12 is disposed somewhat below the geometric center to provide a large passenger compartment 14 having the usual seating 16, outboard overhead storage compartments 18 (primarily for carry-ons), inboard overhead storage compartments 20, and other amenities. Although FIG. 1 shows a Boeing 777, the general layout is similar for a Boeing 747, Boeing 767, Boeing MD11, Airbus A340/330, Ilyushin IL-86/96, as well as derivatives.

Still referring to FIG. 1, of particular concern is the lower lobe 22 below the beams 24 for the main cabin floor 12. In the representative aircraft, the main cabin floor itself is of a thickness of about 1.5 to 2 inches and is supported on floor beams that are 5.5 to 7 inches deep. At the bottom of the aircraft, cargo floor beams 26 support a floor of a thickness of about 2 inches. As seen in FIG. 1, the lower lobe will accommodate transverse rows of two standard LD-3 cargo containers 28 side-by-side. Such cargo containers are about 79 inches wide by 60.4 inches long at the top, and 64 inches high at the center. The bottom outside corners are beveled to accommodate for the circular profile of the lower portion of the aircraft frame. Thus, the bottom of the LD-3 cargo container is about 61.5 inches wide, and the upper vertical portion of the outside wall of the cargo container is about 44.4 inches high, as compared to the 64-inch height at the center. The cargo containers are loaded through cargo doors in the side of the aircraft, and typically can be moved lengthwise along tracks. Other types of cargo containers or pallets can be loaded in the lower lobe 22. For example, the cargo area of the lower lobe typically will accommodate a pallet approximately 96 inches long by 125 inches wide and/or an LD-6 container which is approximately the same size and shape as two side-by-side LD-3 containers. In most aircraft currently in use, 96 inches is about the maximum width that will fit sideways through the cargo door, i.e., lengthwise of the aircraft.

Figure 2:
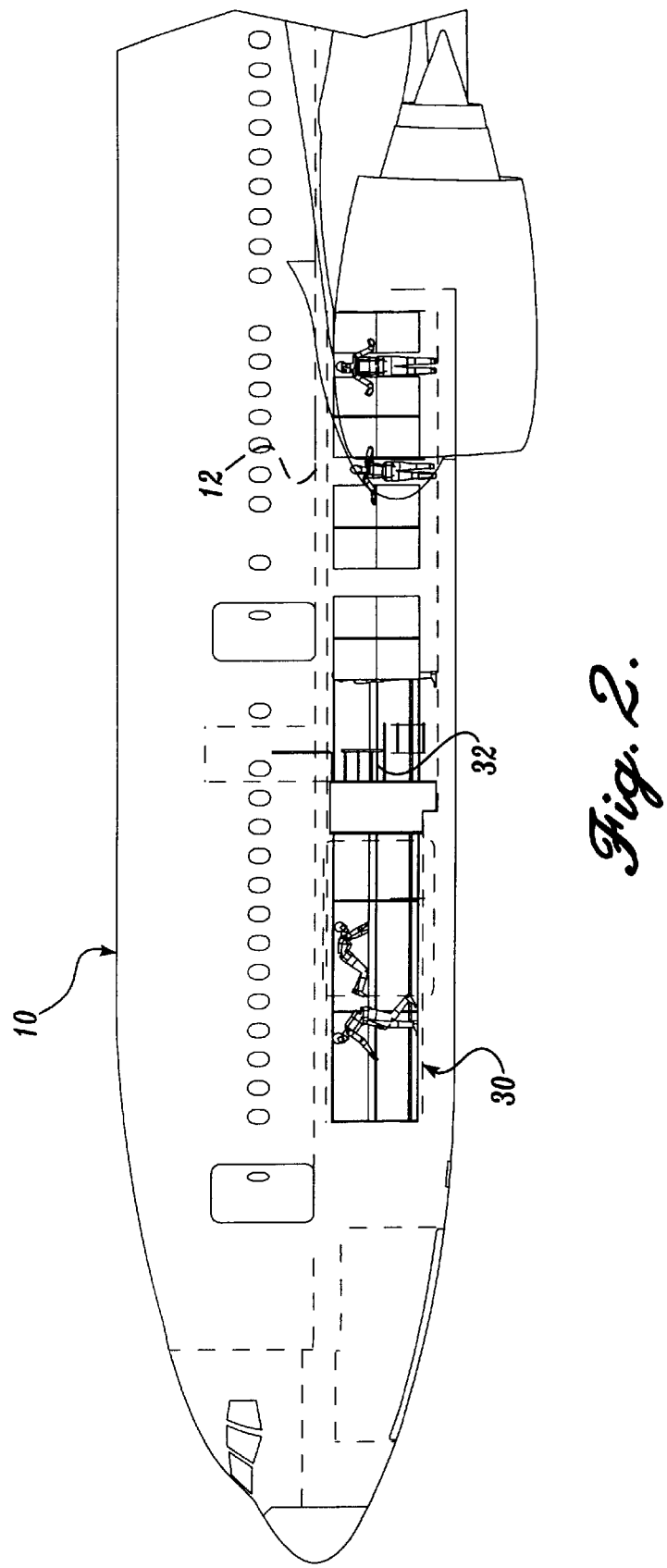
FIG. 2 is a diagrammatic side elevation of such an aircraft, illustrating the location of a lower lobe sleeping compartment in accordance with the present invention.
Figure 3:
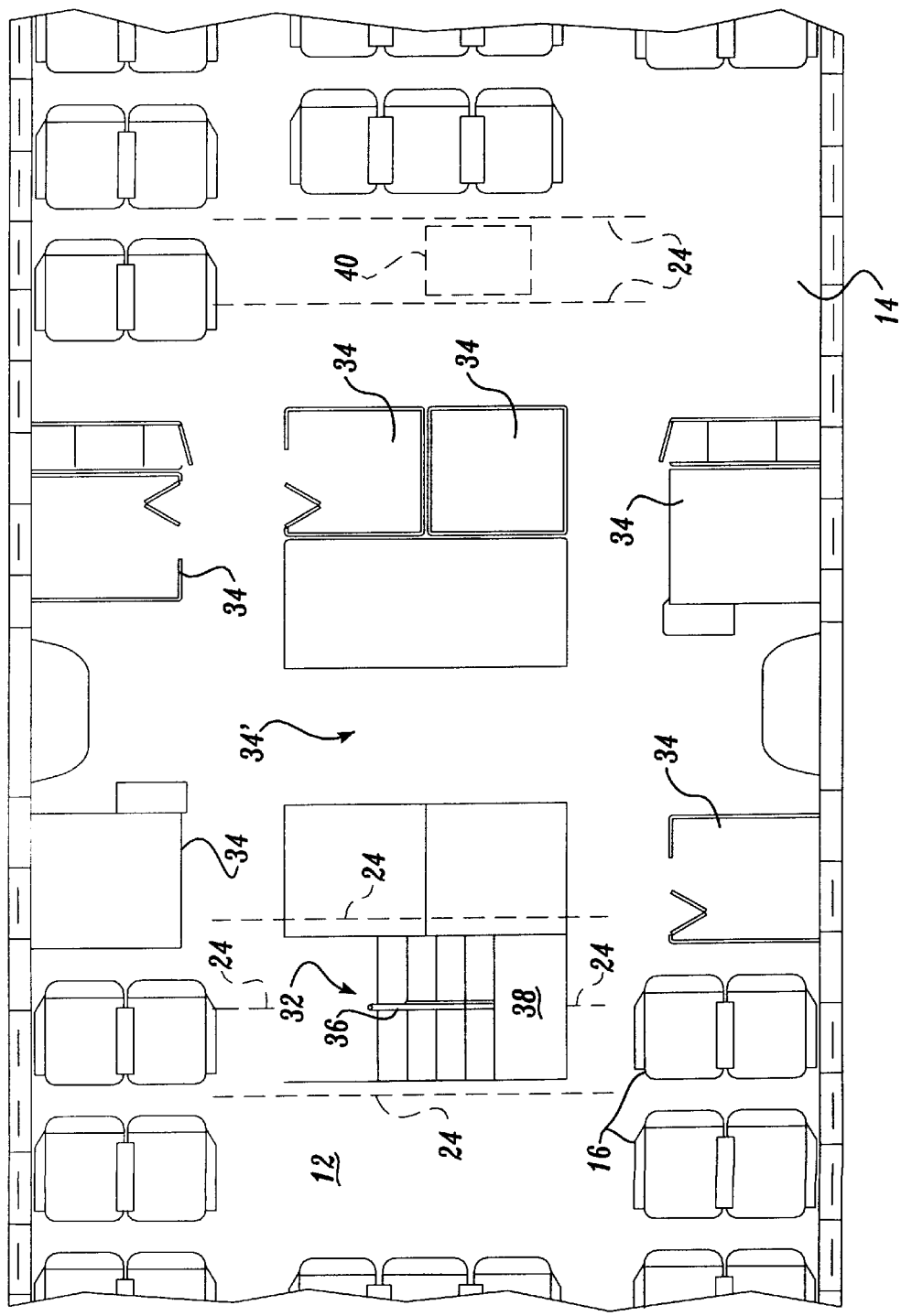
FIG. 3 is a diagrammatic top plan of the main cabin floor of the aircraft of FIG. 2, in the area of a stairway access from the main cabin to the lower lobe sleeping compartment.
Figure 4:
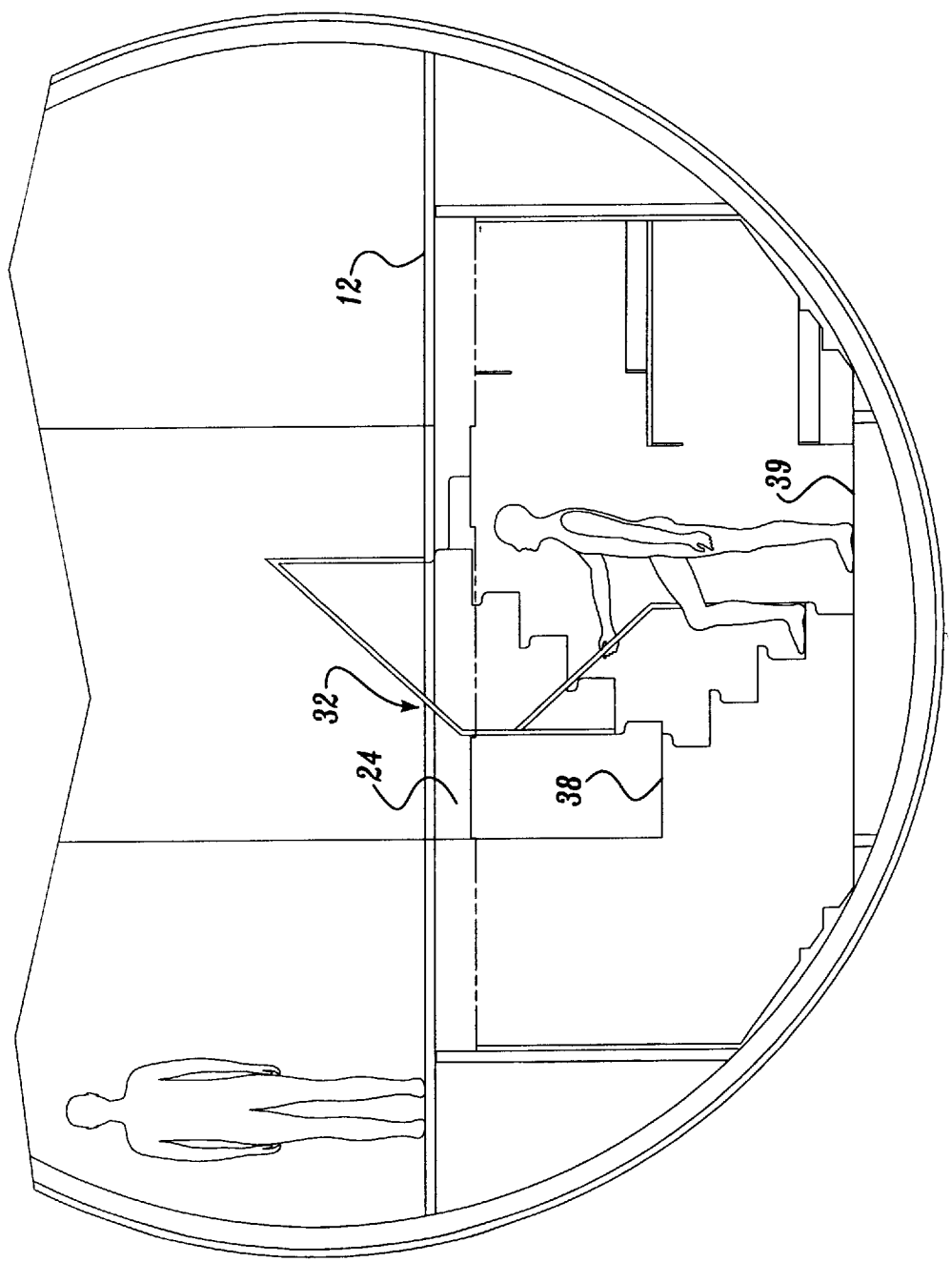
FIG. 4 is a diagrammatic section illustrating the area of the stairway between the main cabin and the lower lobe sleeping compartment.

With reference to FIG. 2, in accordance with the present invention, a sleeping compartment 30 is fitted in the lower lobe of the aircraft 10, below the main cabin floor 12. In order to retrofit or design into existing model aircraft or derivatives, it is desirable that as few changes as possible be required for the main floor of the cabin. Access to the lower lobe sleeping compartment for passengers can be by elevator and/or stairs. For example, FIG. 3 is a plan view of the main passenger cabin 14 with seats 16 and permanent structures 34 (known as "monuments") such as lavatories, closets, and a galley area 34', and FIG. 4 is a diagrammatic side elevation of the stairway area. In the illustrated embodiment of FIGS. 3 and 4, a U-shaped stairwell 32 is provided immediately in front of the galley area 34'. A U-shaped stairwell is preferred since only a single floor beam 24 must be cut and impact on the main cabin layout is minimized. The U-shaped design also makes the stairwell appear roomier than a long, single, narrow stairwell because the wall or railing 36 between the two sides of the stairwell can be angled for a more open feeling. The number of stairs from the main cabin floor 12 to the central landing 38 should preferably be approximately the same as the number of stairs from the landing to the floor 39 of the lower lobe compartment. Another access consideration is the provision of an emergency exit hatch if it is not desired to provide a separate emergency exit in the lower lobe compartment. As seen in FIG. 3, an openable emergency exit hatch 40 can be cut between adjacent floor beams 24 in the main cabin floor.

Figure 5:
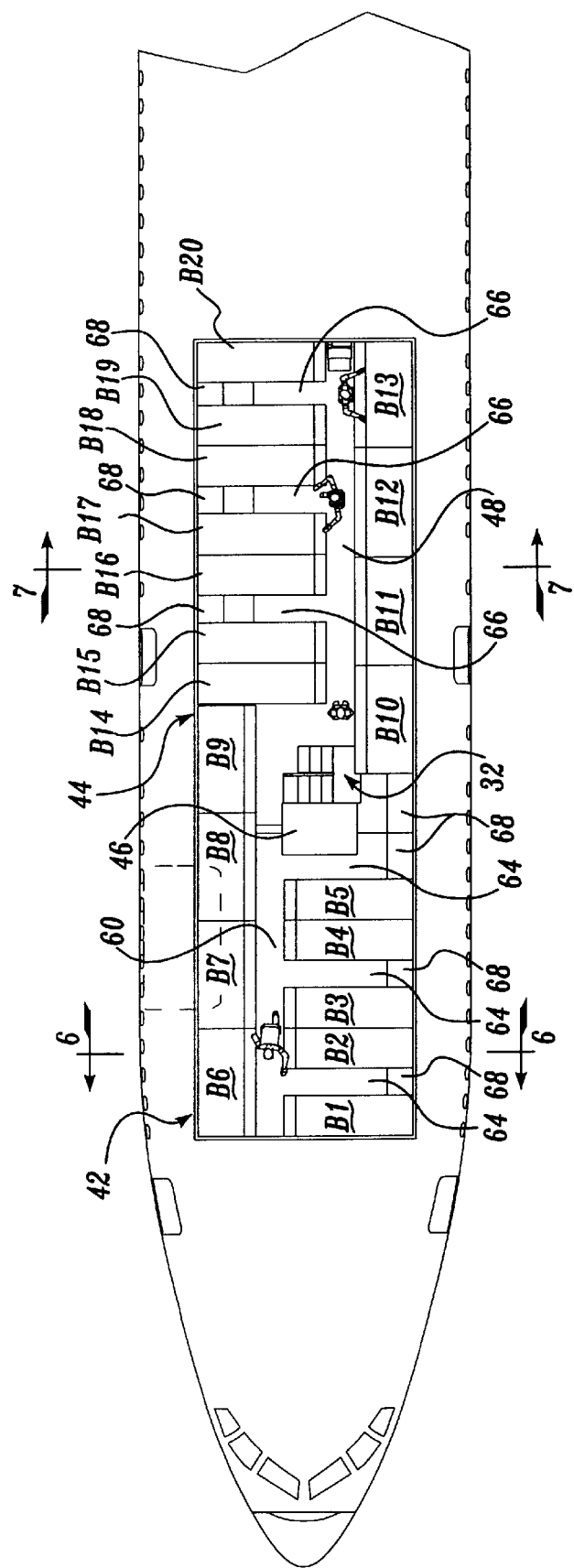
FIG. 5 is a floor plan of the lower lobe sleeping compartment of FIGS. 2–4.
Figure 6:
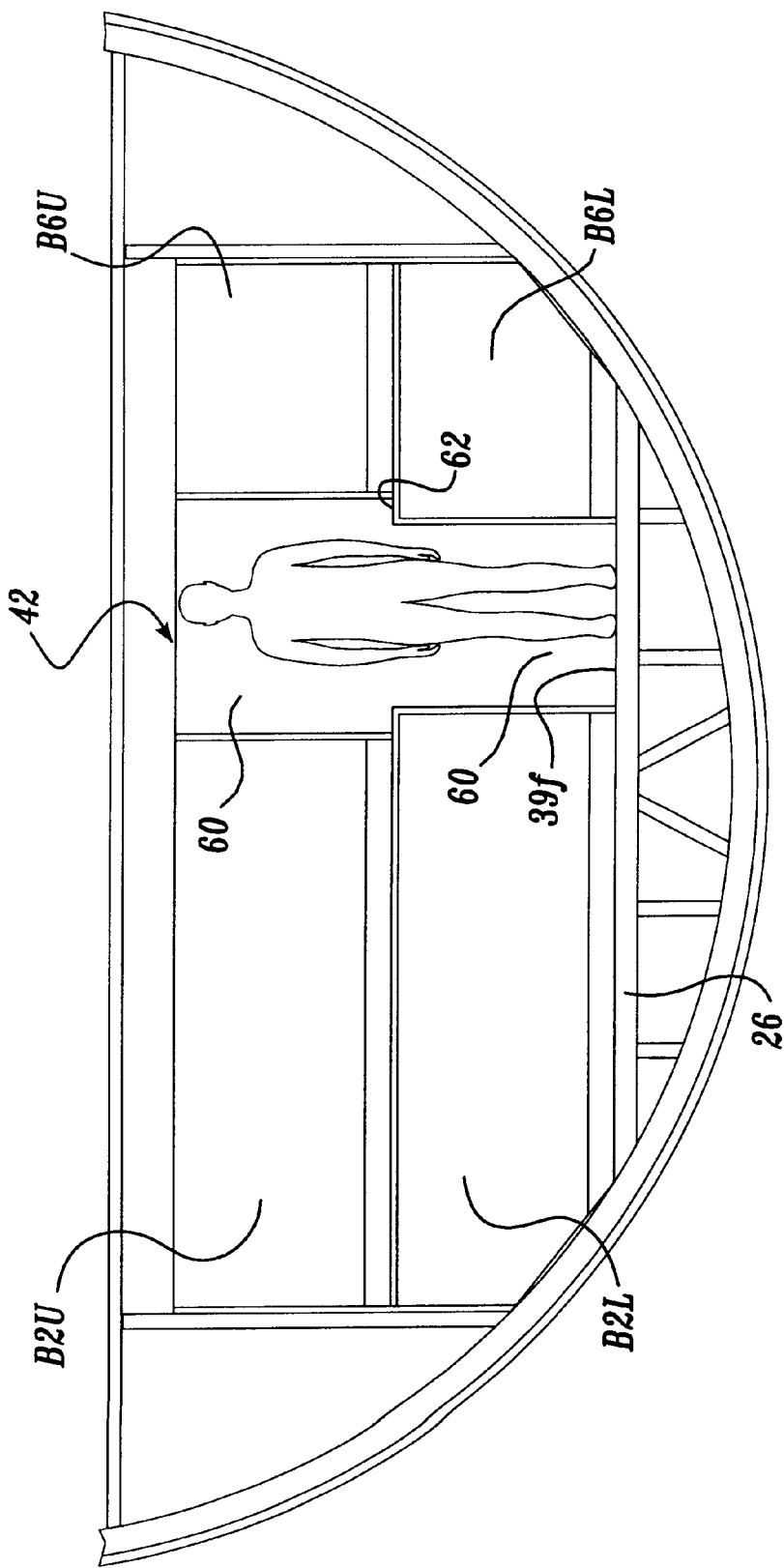
FIG. 6 is a diagrammatic section along line 6—6 of FIG. 5.
Figure 7:
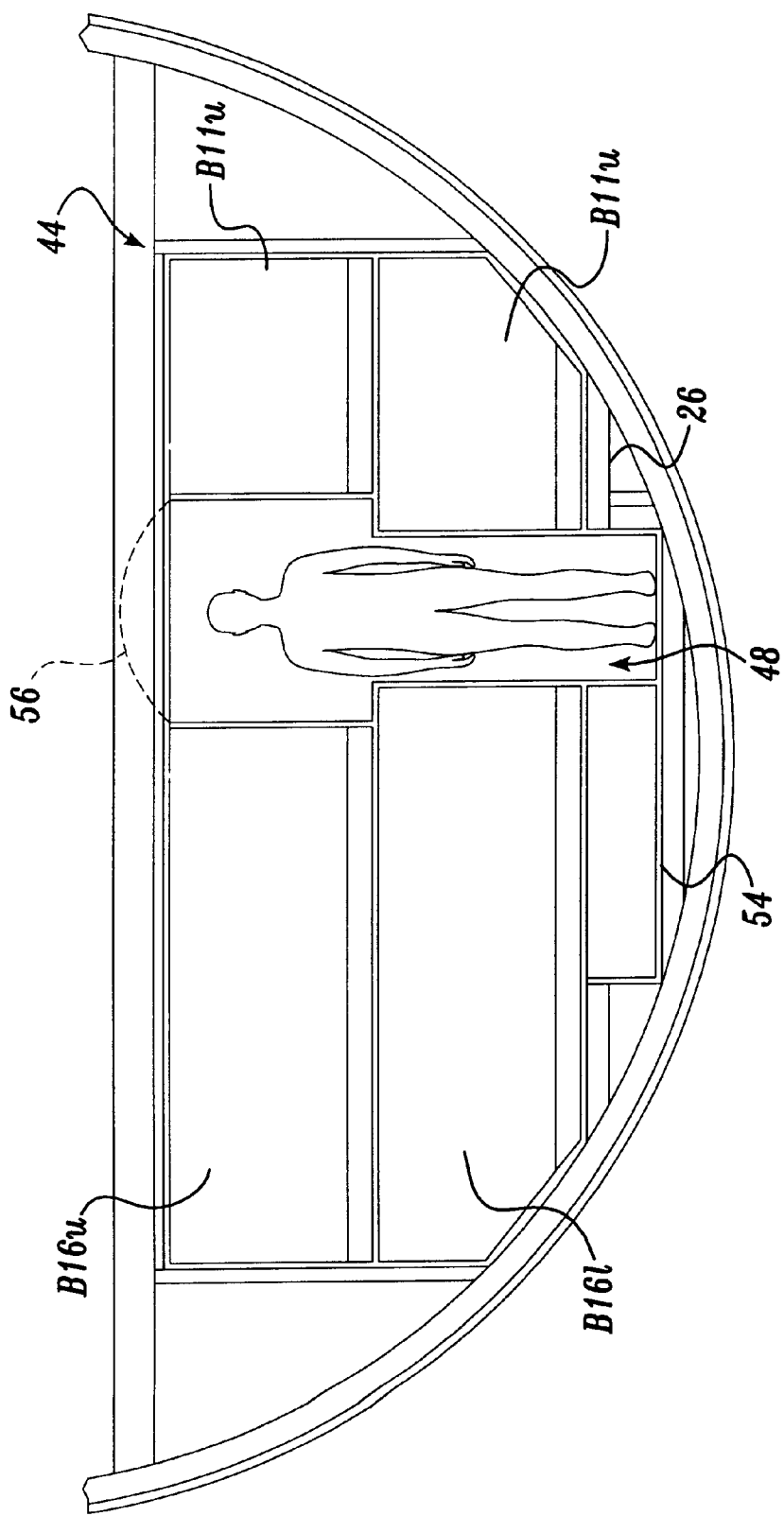
FIG. 7 is a diagrammatic section along line 7—7 of FIG. 5.
Figure 8:
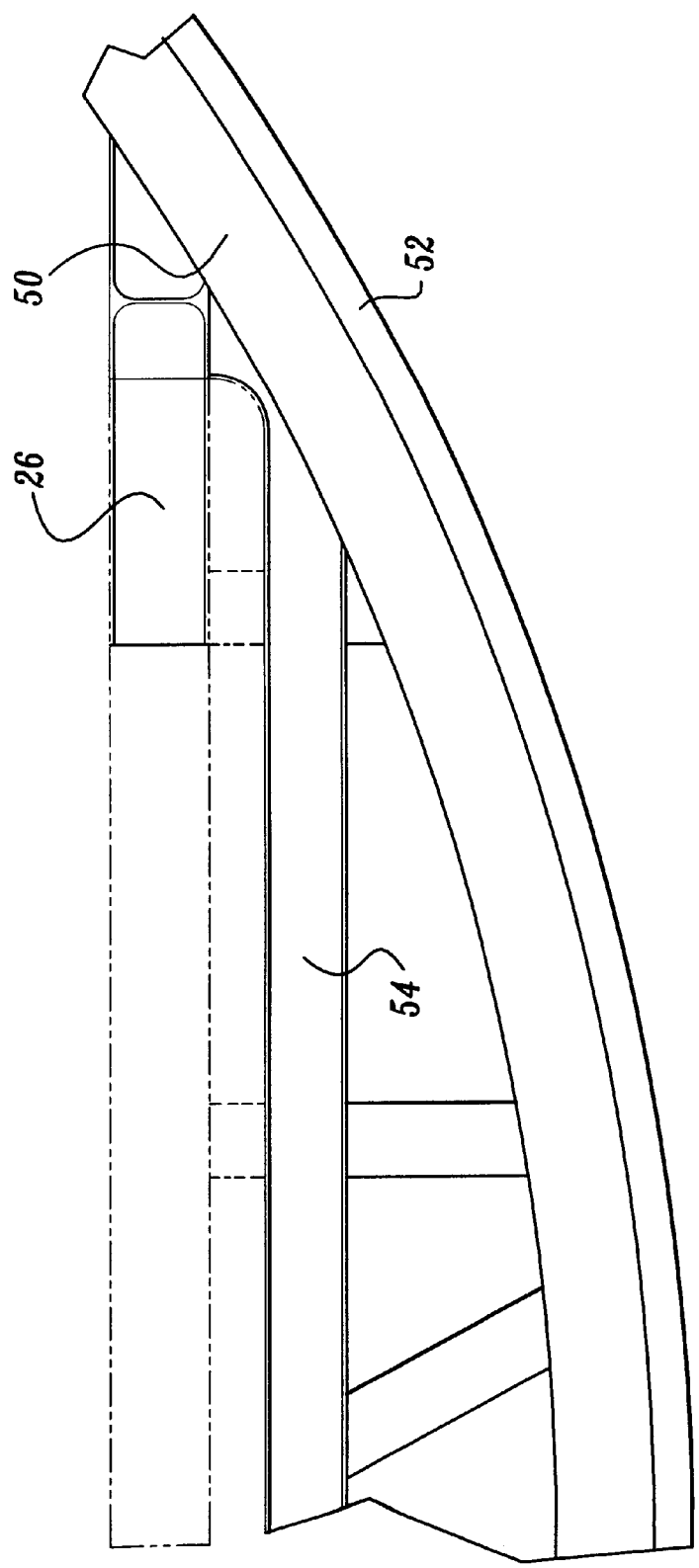
FIG. 8 is an enlarged fragmentary section of the aircraft frame in the area of the rear portion of the lower lobe sleeping compartment of FIGS. 2–7.

A lower lobe sleeping compartment of the size with which the present invention is concerned, i.e., a compartment that will accommodate a substantial number of passengers, will require at least one longitudinally extending aisle. The approximately 64-inch headroom permitted between the top of the cargo floor and the underside of the cabin floor beams is sufficient for a variety of beds and bunks, but is not convenient for an upscale comfortable sleeping compartment. Thus, it is desirable to make provision for more headroom, at least for parts of the sleeping compartment having one or more long aisleways. One way this can be achieved is by lowering the cargo floor. For example, FIG. 5 shows a floor plan, described in more detail below, having a front portion 42 and an aft portion 44. The dividing line between the two portions is immediately forward of any permanent structure including the stairway 32 and an adjacent lavatory 46. As seen in FIG. 6, in the forward portion of the lower lobe compartment, the floor 39f is substantially at the height of the cargo floor. With reference to FIG. 7, in the aft portion 44 of the sleeping compartment, the central portion of the cargo floor is lowered primarily to provide increased headroom in the aisleway 48. As seen in FIG. 8, the upper cargo floor beam 26 is cut a short distance inward from the stringer 50 for the skin 52. The stub of the original beam is connected to a lower horizontal floor beam 54. In this construction, the entire central portion of the aft compartment 44 is lowered. It has been found that headroom of 74 inches is much more appropriate and will accommodate 95% of full-grown males without stooping. Thus, the cargo floor can be lowered by 10 inches without undesirably affecting the layout of the lower lobe sleeping compartment due to the narrower space between the arcuate frame members at the floor level. For all embodiments described herein, the lowered floor portion may be provided only in the aisleways or throughout the lowered floor portion of the compartment. A less desirable alternative is to leave some or all of the cargo floor beams at the normal height, and lower the aisle floor between the beams such that passengers must step over the beams as they pass along the aisleway. Additional headroom also can be provided by "dishing" the ceiling structure over the aisleway for the finished compartment. This can help to increase the aesthetic appeal of the compartment without substantially affecting an efficient layout that will accommodate a maximum number of sleepers. See, for example, the broken line 56 in FIG. 7 representing a dished ceiling.

In the floor plan of FIG. 5, one long aisleway 48 extends lengthwise of the aircraft, aftward from the stairway 32, and offset toward the port side of the aircraft; whereas another aisleway 60 extends forward from the stairway 32, offset toward the starboard side of the aircraft. For a space-efficient arrangement of sleeping units, yet aesthetically pleasing and functional, all beds of this configuration are upper or lower bunks. The locations are designated B1–B20 in FIG. 5, each including an upper bunk and a lower bunk, adding up to a total of forty bunks fitted in a space-efficient manner in the available lower hold space. The forward area includes locations B1–B8. Bunk units B6, B7, and B8 lie along the starboard wall of the aircraft with their lengths extending longitudinally. Each bunk can have a width of 28–34 inches and a length of about 80 inches. Convenient side entry is available for these beds. Access to the upper bunks can be by ladder, rope ladder, foot rests, or platform surfaces on top portions of the lower bunks, with suitable hand-holds and/or other mechanism for facilitating passenger entry to and egress from these beds. With reference to FIG. 6, for each of units B6, B7, and B8, the lower bunk, such as B6L, can have a width at the bottom of about 30 inches, which is a typical desirable bed width. The upper bunk, such as bunk B6U, can have a wider mattress, such as 34 inches, and shifted outward due to the arcuate frame of the aircraft. Thus, the longitudinal aisleway 60 can be wider at the top providing greater shoulder room and easier stooping due to the 64-inch headroom. The inward shifted lower bunk (bunk B6L, for example) can also provide a location for a shelf or step 62 to facilitate access to the outward-shifted upper bunk. In a similar manner the upper transverse bunk can be outward shifted and have a longer mattress than the lower transverse bunk B2L.

Returning to FIG. 5, bunk units B1–B5 of the forward area 42 (nonlowered floor) are oriented transversely of the aircraft. With reference to FIG. 6, the lower transversely extending bunk (such as bunk B2L—the lower bunks of units B1, B3, B4, B5 will be the same) can be 82 inches long, for example, and shifted inward relative to the bunk immediately above it. The upper bunk can be a little longer at the bottom, and reserved for taller passengers. As seen in FIG. 5, bunk units B2 and B3 and bunk units B4 and B5 can be positioned directly side-by-side with only a privacy wall between the adjacent beds. A short cross-aisle 64 provides side access to the bunks of units B3 and B4. Bunk unit B1 can be provided at the forward end of the compartment with a cross-aisle 64 between it and bunk unit B2. Another short cross-aisle 64 is provided aft of bunk unit B5. Thus, convenient side access is provided to each bunk of the forward area 42.

Still referring to FIG. 5, in the aft area 44 of the sleeping compartment, the floor or aisles are lowered. Bunk units B9–B20 are located in this area. Bunk unit B9 extends longitudinally along the starboard side of the aircraft at the foot of the stairway and is substantially identical to bunk unit B8 and located directly behind it. The orientation of the other aft bunks is shown in FIG. 7, which illustrates a section through bunk units B11 and B16, but the section would be the same if the section line is shifted forward or aftward in the rear section 44 of the sleeping compartment through any of bunk units B14–B20. Other than the lowered floor providing for 74-inch headroom in the aisle 48, the layout is the mirror image of the layout for the forward bunk area, and the bunk sizes are the same. Bunk units B10, B11, B12, and B13 extend longitudinally along the port side of the aircraft, with the lower bunk, such as bunk B11L, shifted inward and narrower than the associated upper bunk, such as bunk B11U. With reference to FIG. 5, bunk units B14 and B15 are grouped together, as are bunk units B17 and B18, and bunk units B18 and B19. Bunk unit B20 is provided at the aft end of the compartment, in line with the aft end of the longitudinally extending bunk unit B13. Short cross-aisles 66 provide side access to each bunk. Closets and/or storage compartments 68 can be provided at the ends of the cross-aisles 66 and at the ends of the forward cross-aisles 64.

Figure 9:
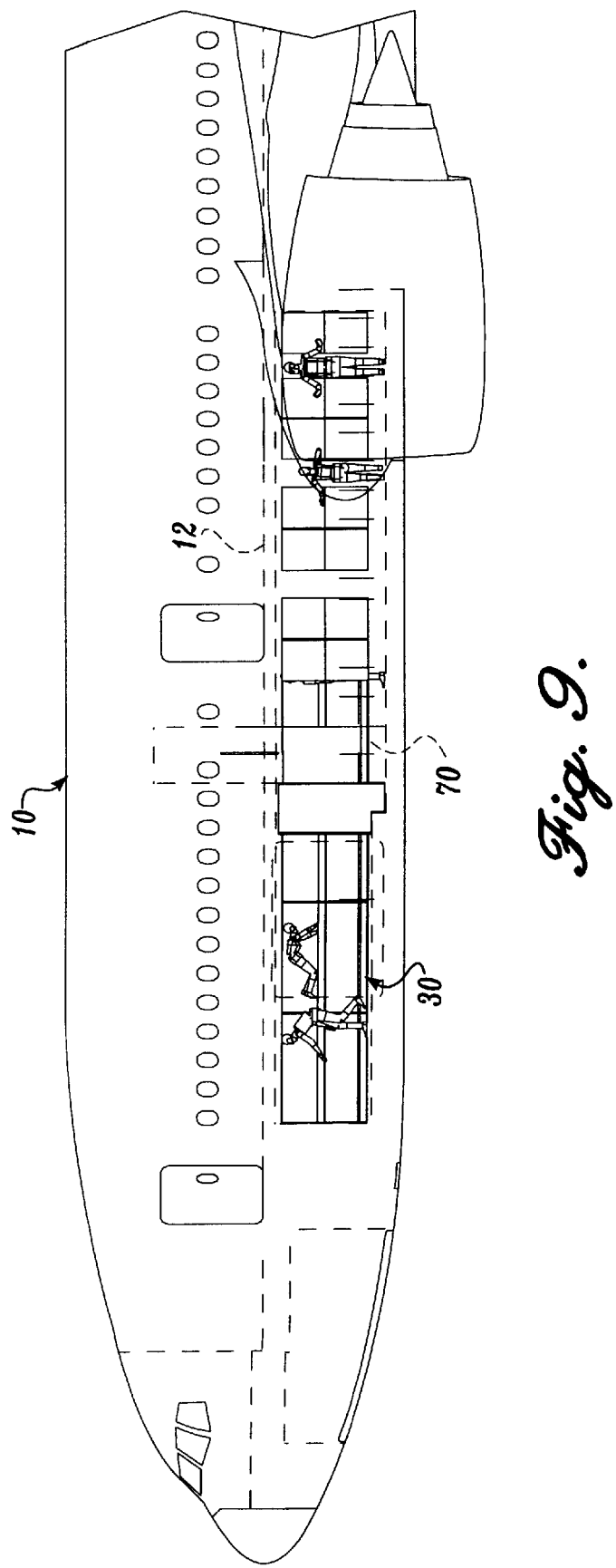
FIG. 9 is a diagrammatic side elevation of an aircraft illustrating an alternative embodiment of a lower lobe sleeping compartment in accordance with the present invention.
Figure 10:
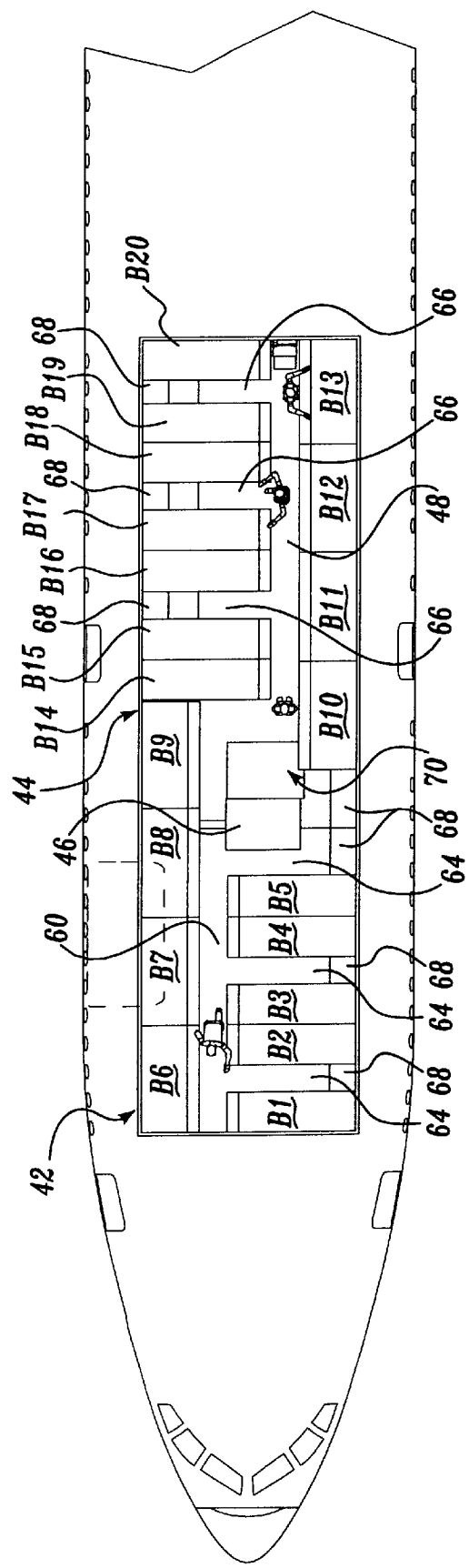
FIG. 10 is a diagrammatic top plan showing the floor plan of the lower lobe sleeping compartment of FIG. 9.

FIG. 9 and FIG. 10 show essentially the same configuration as FIGS. 2 and 4–7 but with an elevator 70 for access between the main cabin and the lower lobe sleeping compartment in accordance with the present invention. Bunk units B1–B20 are located and sized substantially identically for this embodiment as for the previously described embodiment.

Although it has been found that aisleways with increased headroom are highly desirable, nevertheless it is envisioned that the sleeping compartments can be less than permanent additions to the aircraft. For locations where the cargo floor is altered, much more time will be required to restore the aircraft to a cargo-carrying capability than for areas where the cargo floor and its loading components are unaltered. Thus, at least part of the lower lobe sleeping compartment can be provided with aisleways of about 64-inch headroom (or whatever the standard lower lobe height is in the particular aircraft) with, perhaps, fewer beds and/or aisles that are not as long as in the lowered floor area. For maximum flexibility, the nonlowered floor sleeping compartment area should be located adjacent to an existing cargo door and, as discussed in more detail below, the sleeping compartment for that area can be provided in modules loadable through the cargo door, secured in place on the cargo floor or on cargo roller trays, and connected together. Thus, the nonlowered floor area can be quickly and easily changed to cargo-carrying capability without necessarily altering the more spacious lowered floor area of the sleeping compartment. Also, it is envisioned that the lower lobe sleeping compartment would probably be provided for first class and/or business class passengers who typically ride toward the front of the aircraft, such that the forward lower lobe would preferably be used for the sleeping compartment. This conveniently lends itself to positioning the nonlowered floor part of the sleeping compartment adjacent to the forward cargo door, with the more permanent amenities (lavatory and stairwell/elevator, for example) positioned slightly to the rear, and the lowered floor component aft of the stairwell.

Figure 11:
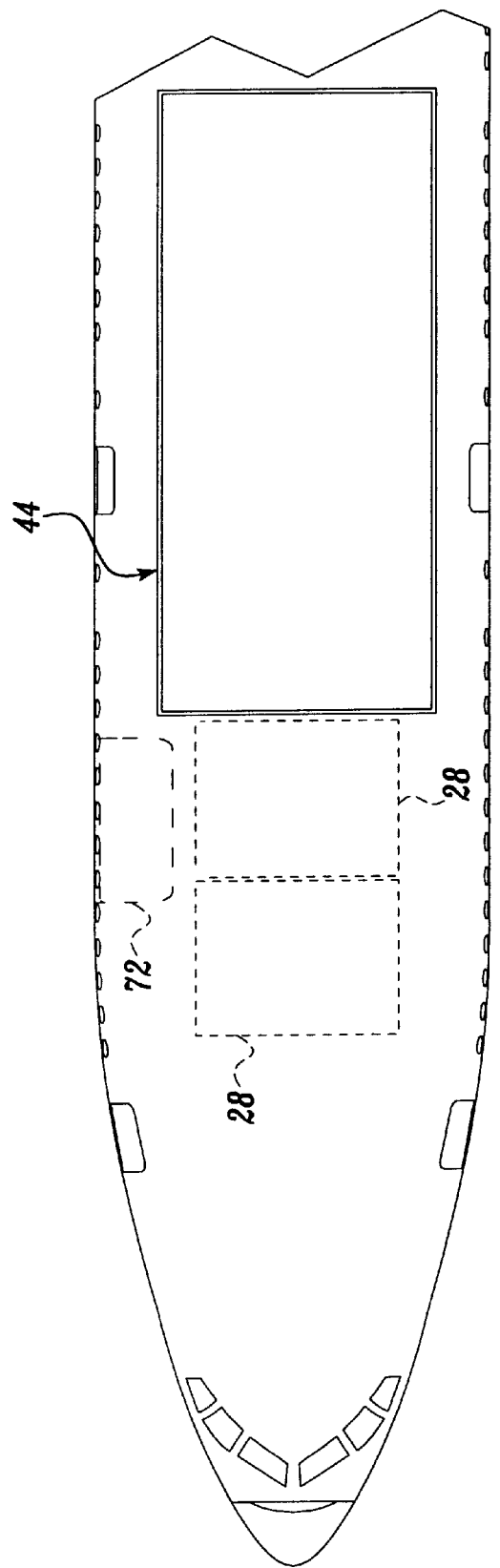
FIG. 11 is a diagrammatic top plan of an aircraft illustrating a lower lobe sleeping compartment and adjacent baggage/cargo area.
Figure 12:
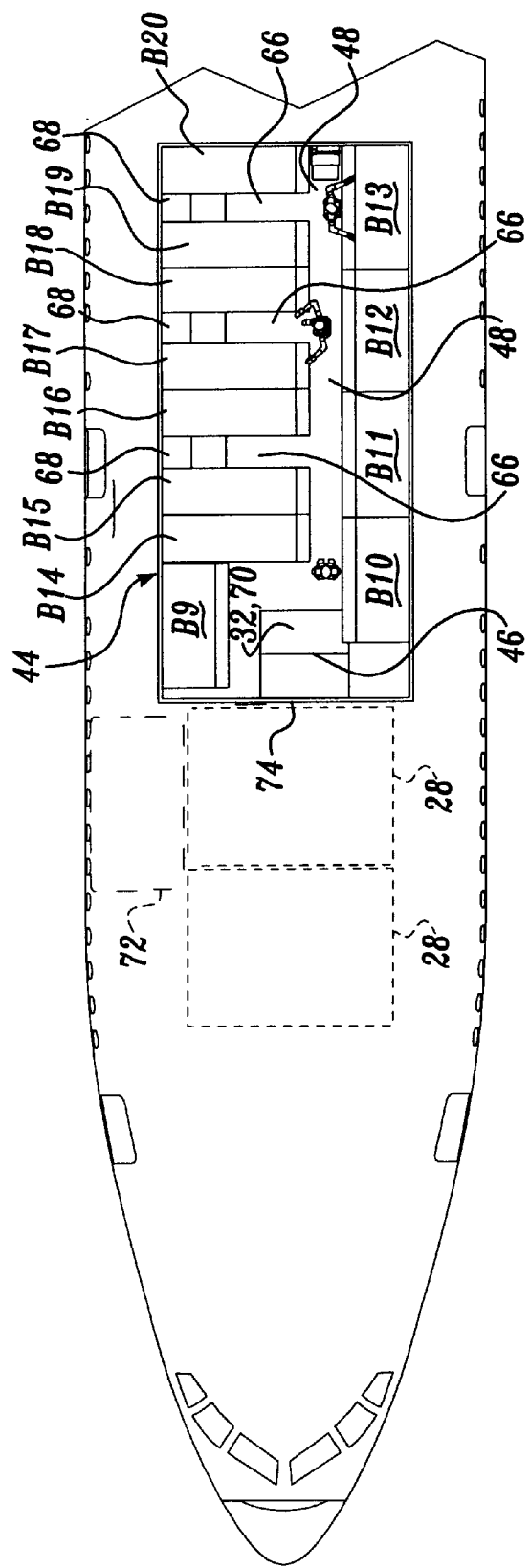
FIG. 12 is a top plan corresponding to FIG. 11 showing a floor plan for the sleeping compartment.

For example, with reference to FIG. 11, the aft portion 44 of either of the lower lobe sleeping compartments previously described can be closed at its forward end, just ahead of the lavatory 46 shown in FIG. 5 and in FIG. 10. Standardized cargo containers 28 such as cargo pallets or Unit Load Devices (ULDs) then can be loaded through the standard cargo door 72, in the conventional manner, the only difference being that the aft portion of the aircraft lower lobe in this location is dedicated to the sleeping compartment 44. The layout of the sleeping compartment 44 can be as shown in FIG. 12, which corresponds generally to the layouts previously described for bunk units B9–B20, adjacent to the main cabin access 70 or 32 (elevator/stairwell), and with a forward lavatory 46. Conversion can be by removal of the forward wall 74, followed by insertion and assembly of sleeping compartment modules to form the forward area 42 (see FIG. 5 and FIG. 10) which rests on the cargo hold floor or roller trays. One such module can encompass bunk units B1, B2, and B6, a second module can encompass bunk modules B3, B4, and B7; and a third module can encompass the remaining area of the forward compartment 42 including bunk units B5 and B8. These modules can be loaded individually through the cargo door 72 and assembled within the aircraft if it desired to convert from the cargo carrying capability to a larger lower lobe sleeping compartment. The aft portion also could be configured for cargo carrying, but much more work would be required to raise the floor and incorporate standard cargo handling equipment in addition to removing the sleeping modules. In an infrequent conversion, the elevator/stairwell and lower lavatory also could be removed.

Figure 13:
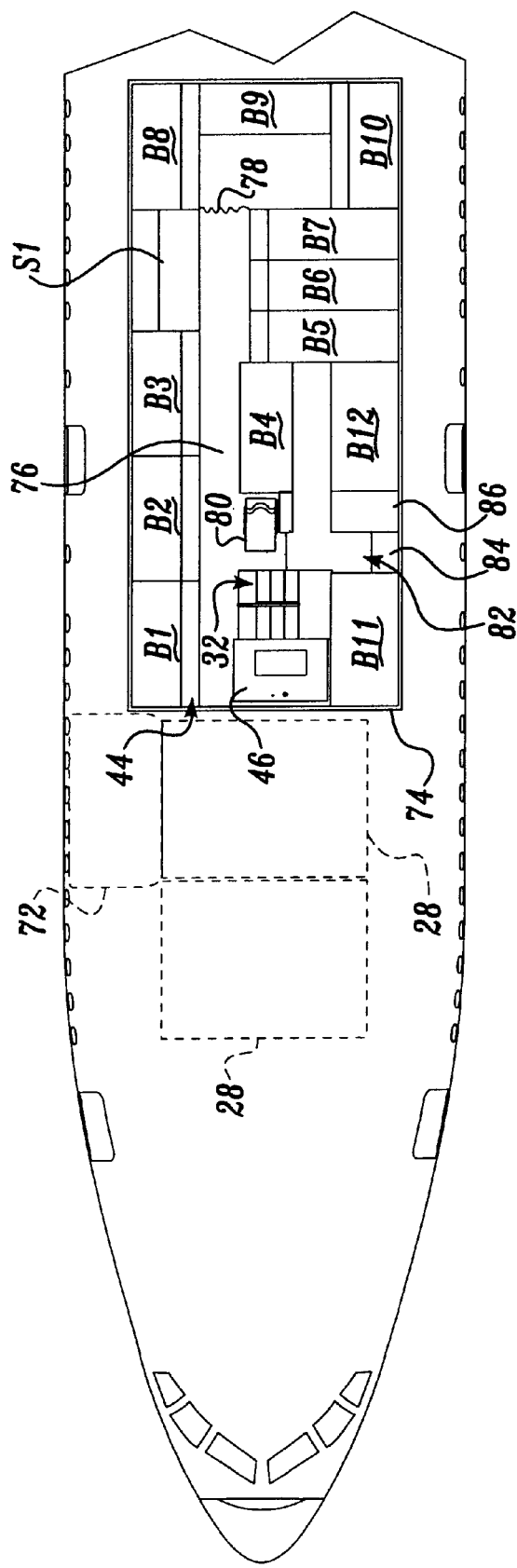
FIG. 13 is a diagrammatic top plan illustrating the floor plan of another lower lobe sleeping compartment with an adjacent baggage/cargo area.

The modified design shown in FIG. 13 illustrates how the lower lobe compartment can be utilized as sleep and rest areas for passengers, flight attendants, and pilots. The sleeping compartment corresponds to the aft portion 44 (see FIG. 11) which includes a lowered floor, at least in the aisleways, and a front wall 74 separating the compartment from the forward part of the lower lobe reserved for cargo, such as standardized cargo containers 28. The forward wall is positioned at the same location as for the previously described embodiment, namely, in front of a shared lavatory 46. Another permanent monument is the stairway 32 located immediately aft of the lavatory. Passenger sleeping is provided in bunk units B1–B7. Bunk units B1, B2, and B3 extend along the starboard wall of the aircraft and are identical to bunk units B6, B7, and B8 of the embodiment of FIG. 5. Bunk unit B4 is spaced inward of bunk units B2 and B3, along the central vertical plane of the aircraft, with an aisleway 76 between unit B4 and the starboard side units. Unit B4 has upper and lower bunks, both of which may be accessed from the side by way of aisleway 76. The last three passenger bunk units are labeled B5, B6, and B7 in FIG. 13, corresponding to any of the transversely extending units of FIG. 5, except that in the case of the configuration of FIG. 13, the upper and lower bunks of units B5, B6, and B7 have end access from aisleway 76 only. A storage unit S1 can be provided across aisleway 76 from the passenger bunk units B5, B6, and B7.

The attendant rest area can be provided at the aft of the lower lobe sleeping compartment, separated from the remainder of the compartment by a door or curtain 78. This areas consists of bunk units B8, B9, and B10, each including an upper bunk and a lower bunk, such units being arranged in a U-configuration.

Toward the other end of the sleeping compartment, a high-comfort attendant/pilot seat 80 can be provided, immediately in front of bunk unit B4. By slipping in front of the seat, access is provided to a pilot cabin 82 with relatively increased space for resting and sleeping including single-bed units B11 and B12 (no upper bunks) and storage or resting locations 84 and 86. Thus, the configuration of FIG. 13 provides resting areas for six attendants and two pilots, plus sleeping accommodations for 14 passengers.

Figure 14:
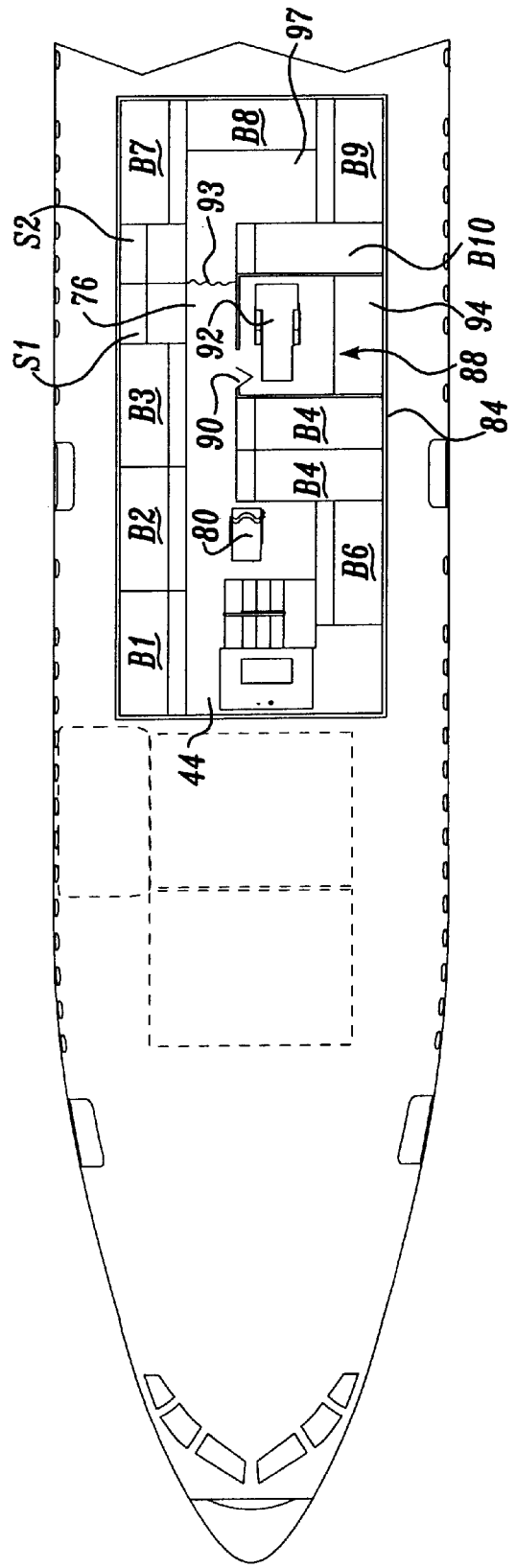
FIG. 14 is a diagrammatic top plan corresponding to FIG. 13 illustrating another floor plan for the lower lobe sleeping compartment adjacent to the baggage/cargo area.

The configuration of FIG. 14 has many characteristics similar to the configuration of FIG. 13. Passenger bunk units B1, B2, and B3 are identical to the similarly numbered units of the preceding figure. A center, high-comfort attendant/pilot rest seat 80 is provided at the same location as for FIG. 13. Transversely extending passenger bunk units B4 and B5 are provided substantially immediately aft of seat 80, each having end access to upper and lower passenger bunks. An additional longitudinally extending passenger bunk unit B6 extends along the port side of the aircraft, in front of the transversely extending units B4 and B5. A single pilot bunk and rest area 88 is provided aft of bunk unit B5, with a separate entrance door 90, recliner or high-comfort seat 92, and single bed 94. Another door or curtain 93 in the aisleway 76, aft of the door 90 to the pilot cabin, leads to an attendant rest area having bunk units B7, B8, B9, and B10 arranged in a generally rectangular configuration with an open area 97 between them. Storage units S1 and S2 can be provided between bunk units B3 and B7, one at each side of the entrance door or curtain 93 that segregates the attendant rest area from the remainder of the lower lobe compartment 44.

Figure 15:
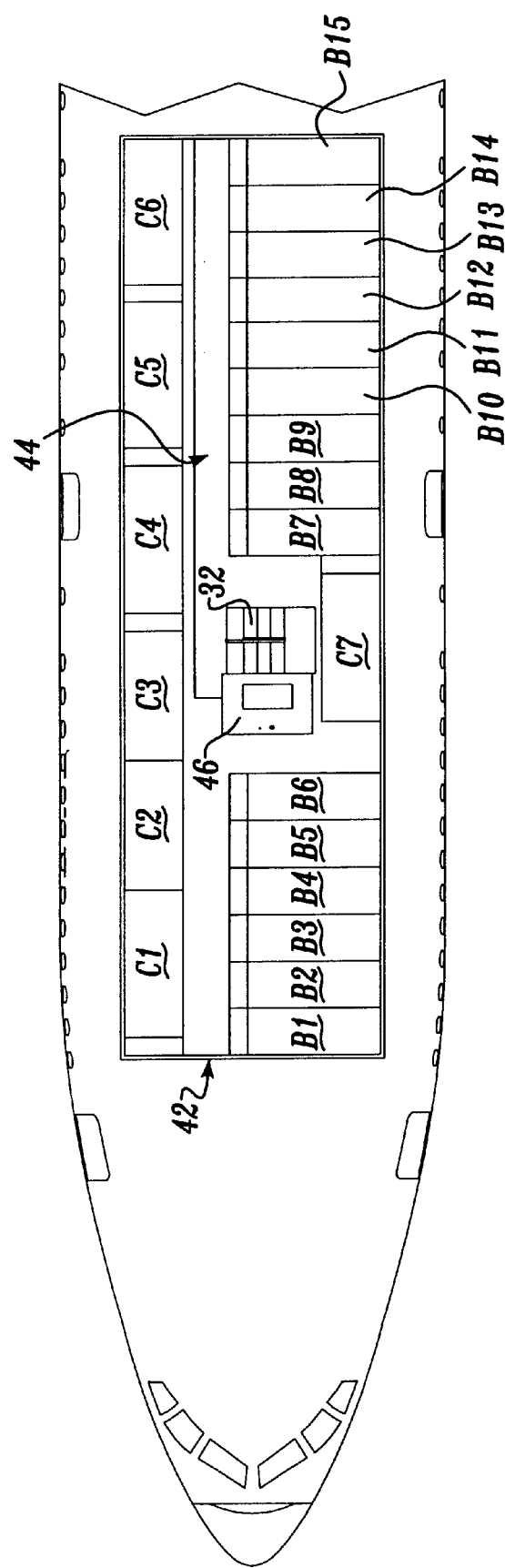
FIG. 15 is a diagrammatic top plan illustrating another floor plan for a lower lobe sleeping compartment in accordance with the present invention.
Figure 16:
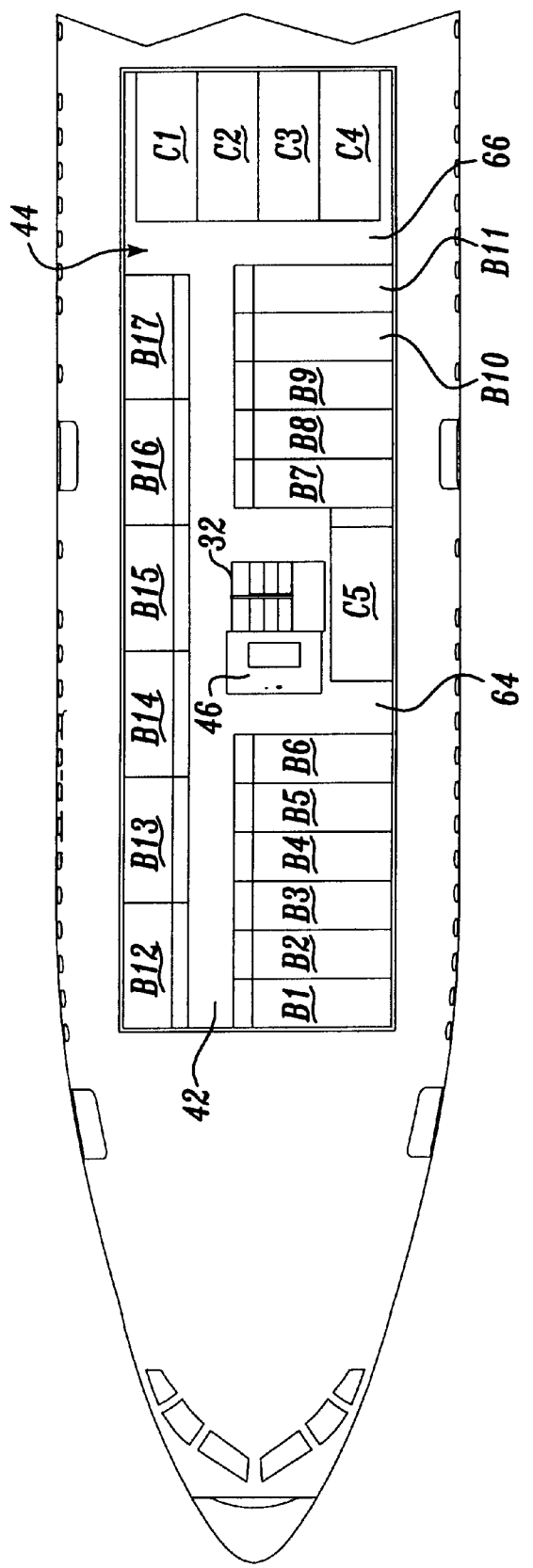
FIG. 16 is a diagrammatic top plan illustrating yet another floor plan for a lower lobe sleeping compartment in accordance with the present invention.

FIG. 15 and FIG. 16 each show high-density lower lobe sleeping compartments using both the forward nonlowered floor area 42 and aft lowered floor area 44. In the configuration of FIG. 15, the stairway 32 and lavatory 46 are located as in the previously described embodiments. The forward modular portion 42 with the nonlowered floor can include closely packed transversely extending bunk units B1–B6, all having end access except the aft unit B6 which has side access from its aft side by way of a cross-aisle 64. Similarly, in the aft portion of the compartment, transversely extending bunk units B7–B15 are provided, with no cross-aisles, so that these units have end access, except the front unit B7. The bottom bunks are shifted inward in the manner shown in FIGS. 6 and 7 due to the curvature of the aircraft frame. Along the starboard side, cabin units C1–C6 can be provided, each having a single bed or, for example, a convertible recliner of the type discussed in more detail below. These units, being larger than the others and having the convenient side access, could command a premium fare. Another similar cabin C7 can be located on the port side of the aircraft adjacent to the stairway 32.

In the configuration of FIG. 16, transversely extending, high-density bunk units B1–B6 are provided at the forward, port side of the sleeping compartment, in the nonlowered floor area 42 which can be more easily convertible to cargo/baggage space as described above. These units are identical to units B1–B6 of the configuration of FIG. 15. Bunk units B7–B11 are provided at the same locations as for the similarly numbered units shown in FIG. 15, unit B11 being the aftmost unit with a cross aisle 66 behind it so that this unit has side access. Additional bunk units B12–B17 can be located at the starboard side of the aircraft, extending longitudinally, one behind the other. Each unit B12–B17 has side access and includes a lower bunk offset inward relative to an upper bunk, as previously described. At the rear of the compartment, cabins C1–C4 can be provided, each having a door opening into the cross-aisle 66 which extends from one side of the compartment to the other. Each cabin can include a single bed, recliner, or other upscale amenities for use by pilots or commanding a premium fare when used by passengers. A final cabin C5 can be provided behind the stairway 32 as in the embodiment of FIG. 15, accessible by a short cross-aisle 66 behind the stairway 32.

Figure 17:
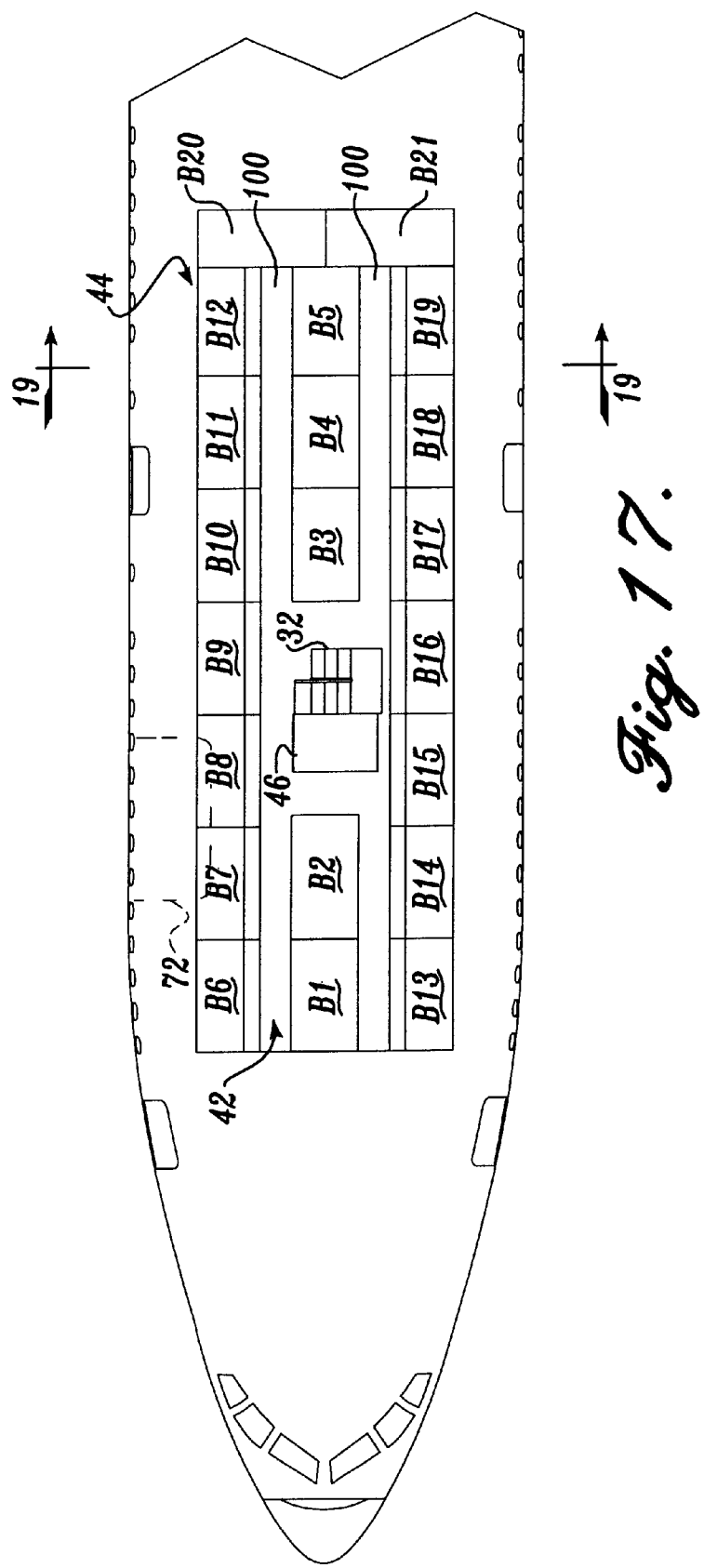
FIG. 17 is a diagrammatic top plan illustrating still another floor plan for a lower lobe sleeping compartment in accordance with the present invention, in this case having dual longitudinally extending aisleways.
Figure 18:
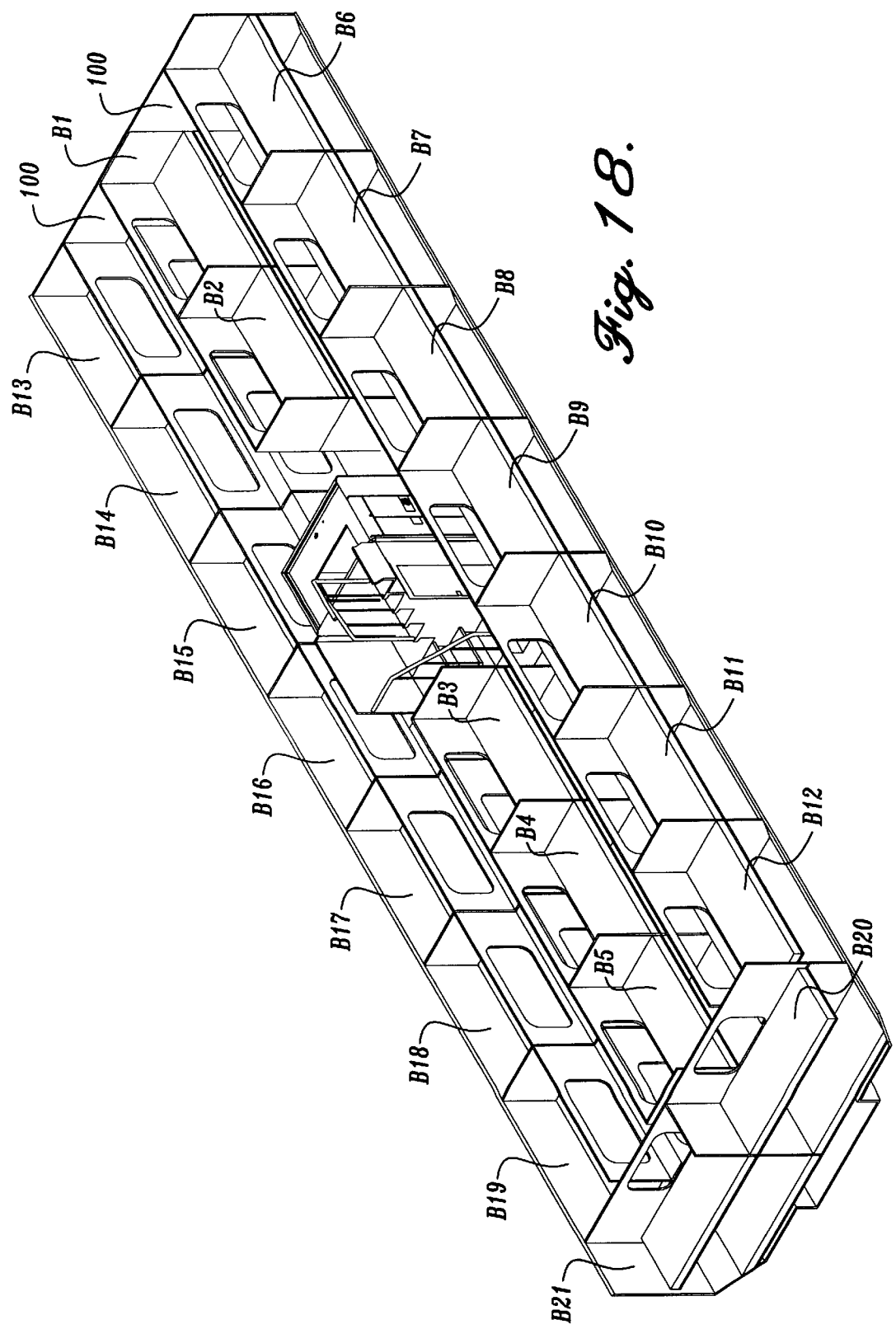
FIG. 18 is a diagrammatic top perspective of the lower lobe sleeping compartment of FIG. 17.
Figure 19:
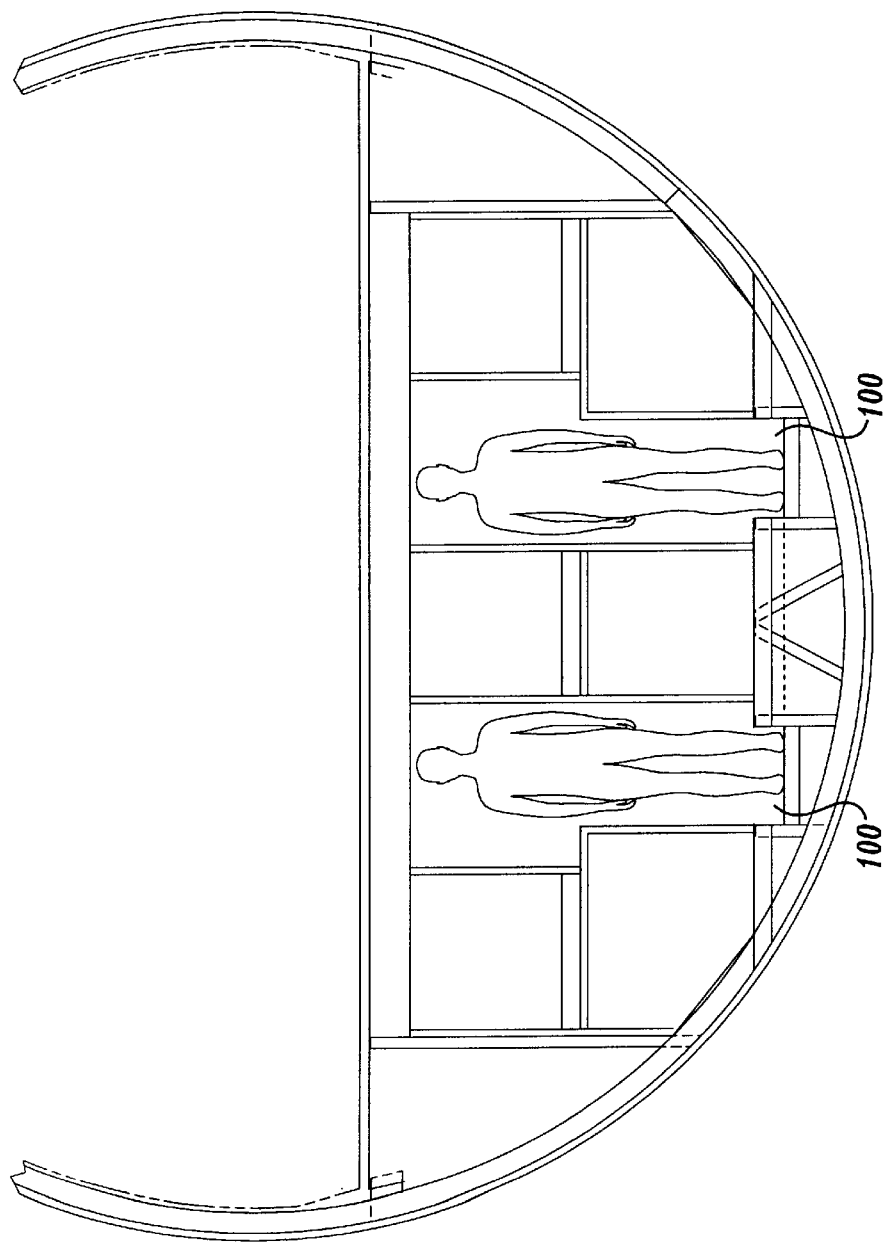
FIG. 19 is a diagrammatic section along line 19—19 of FIG. 17.

FIGS. 17–19 illustrate another configuration for a lower lobe sleeping compartment, in this case using two longitudinally extending aisleways 100 so that all bunks can be arranged longitudinally. The configuration includes bunk units B1 and B2 centrally located in front of the lavatory 46 and bunk units B3, B4, and B5 located behind the stairway. In each case, the upper bunk of the unit has one side access opening toward one of the aisles 100, whereas the lower bunk of the same unit has a side access opening toward the other of the aisles. This helps to prevent congestion. At the starboard side of the aircraft, bunk units B6–B12 are provided, of the type generally described for bunk units extending longitudinally at one side or the other, including the lower bunk shifted inward relative to the upper bunk. Bunk units B13–B19 at the opposite side are the mirror image of bunk units B6–B12. At one or the other end, two short bunk units B20 and B21 can be provided, with smaller side access openings toward the aisleways 100. The floor can be lowered in the manner described previously, or, as illustrated in FIG. 19, only for the long aisleways, preferably only in the aft portion 44 of the sleeping compartment so that the forward portion 42 can be more quickly and easily converted to baggage/cargo carrying by use of standardized equipment. Thus, the bunk units of the forward unit preferably are modular, and loadable through the conventional cargo door 72 for being secured together with the lesser headroom in the forward portions of aisleways 100. It should be noted that in FIG. 18, the starboard wall (closest to the viewer) is deleted for the long row of side bunks B6–B12 and for the center bunks B1–B5, for ease of illustration.

Figure 20:
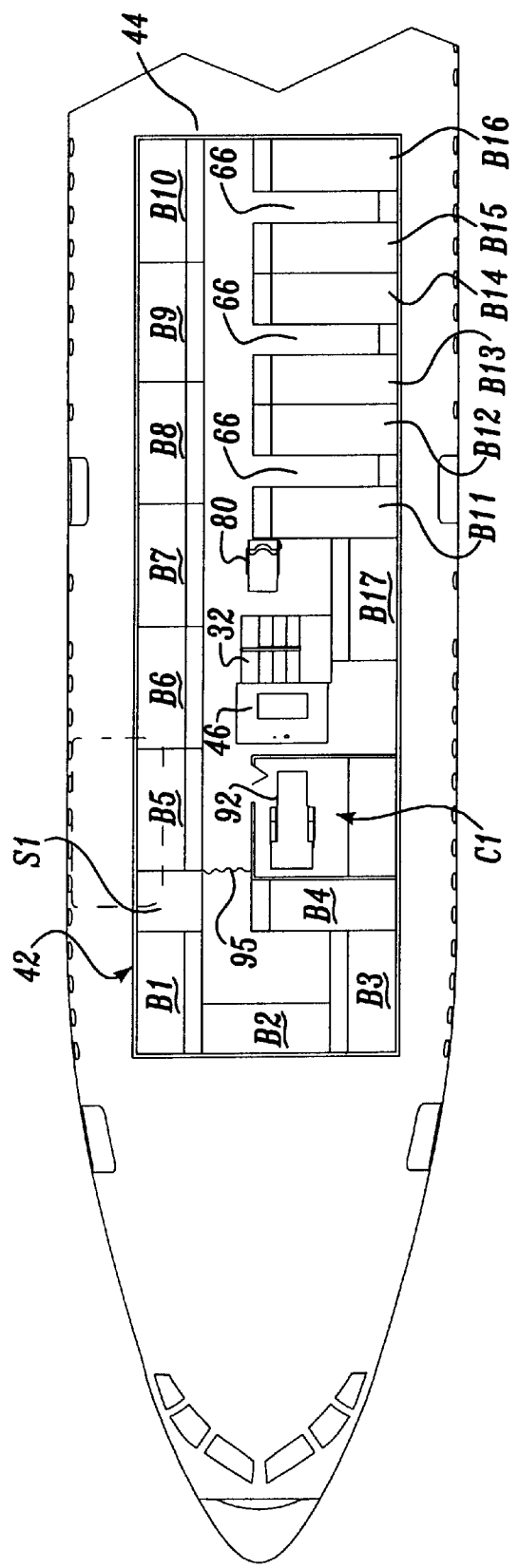
FIG. 20 is a diagrammatic top plan illustrating another embodiment of a lower lobe sleeping compartment in accordance with the present invention, including a cabin convertible between sitting, reclining, and sleeping configurations.

The configuration of FIG. 20 has characteristics in common with the previously described configurations. Toward the front, an attendant rest area is provided of bunk units B1, B2, B3, and B4 arranged in a generally rectangular configuration, similar to the aft attendant rest area shown in FIG. 14 (numbered B7–B10 in that figure). A storage unit S1 can be provided immediately behind bunk unit B1 which extends longitudinally of the aircraft at the starboard side. A door or curtain 95 separates the attendant area from the remainder of the lower lobe sleeping compartment. A pilot's cabin C1 is provided immediately to the rear of bunk unit B4, including, for example, a recliner 92. To the aft of the attendant rest area, bunk units B5–B10 extend longitudinally of the aircraft at the starboard side, one behind the other, each having a lower bunk shifted inward relative to an upper bunk. In the aft portion 44 of the sleeping compartment, and at the port side, transversely extending bunk units B11–B16 are provided, unit B11 being a single unit with a cross-aisle 66 between it and unit B12, units B12 and B13 being placed side-by-side with only a privacy wall between them, units B13 and B14 being spaced apart by a cross-aisle 66, units B14 and B15 being placed side-by-side with a privacy wall between them, and a cross-aisle 66 between units B15 and B16. This allows for side access to all of bunks B5–B16. An attendant/pilot rest chair 80 is provided in the location described with respect to other embodiments, close to the stairway 32, with an additional bunk unit B17 extending longitudinally along the port side of the aircraft adjacent to the stairwell, in front of the transversely extending bunk unit B11. Thus, in the configuration of FIG. 20, if other arrangements are made in or around the main cabin for pilot and attendant rest areas, the nonlowered forward portion 42 can be disassembled so that this area can be used for cargo/baggage carrying, or other modular passenger units can be installed. Bunk units B6–B17 will remain for passenger use in either case.

Figure 21:
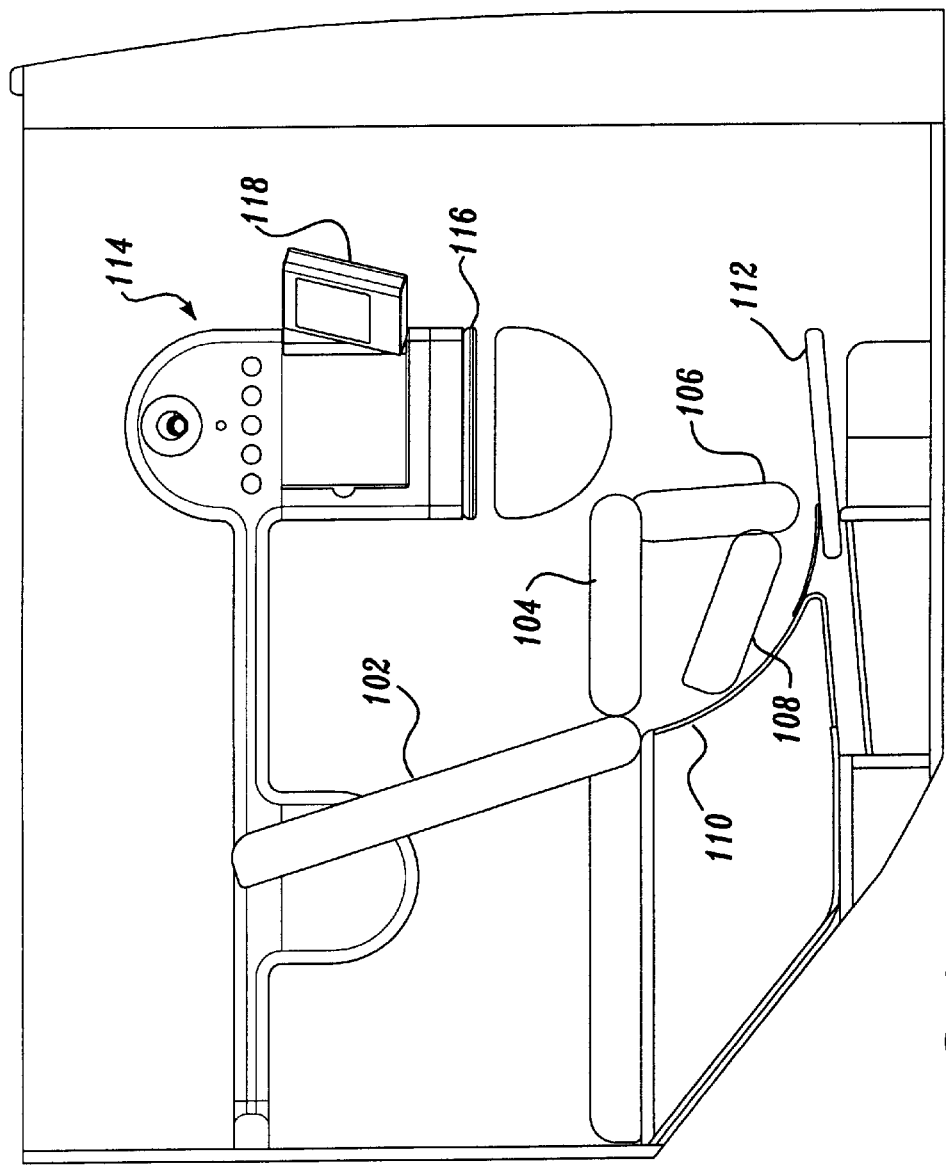
FIG. 21 is a diagrammatic side elevation of the cabin of FIG. 20 illustrating a sitting configuration.
Figure 22:
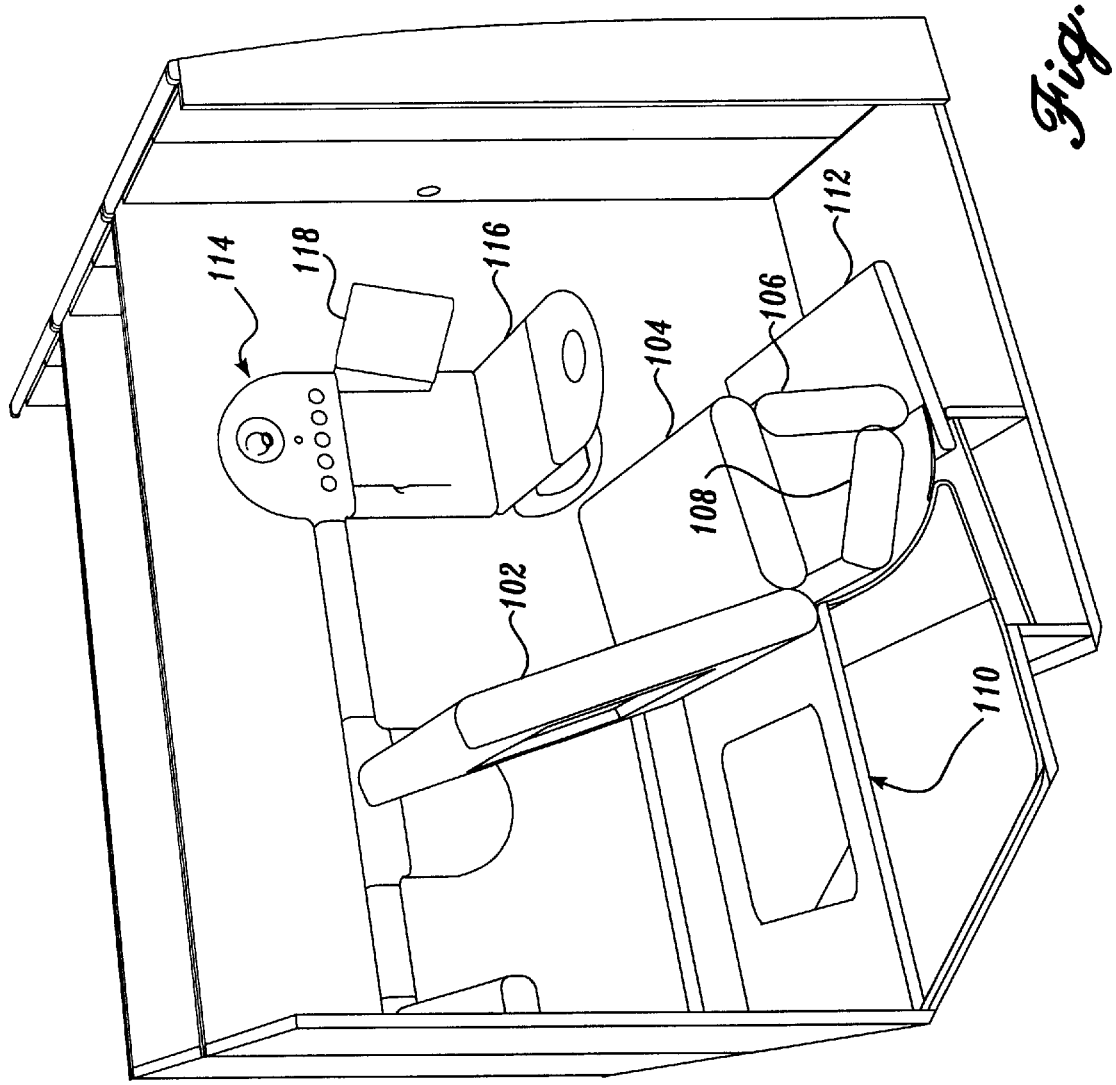
FIG. 22 is a top perspective of the cabin of FIG. 21 illustrating the sitting configuration.
Figure 23:
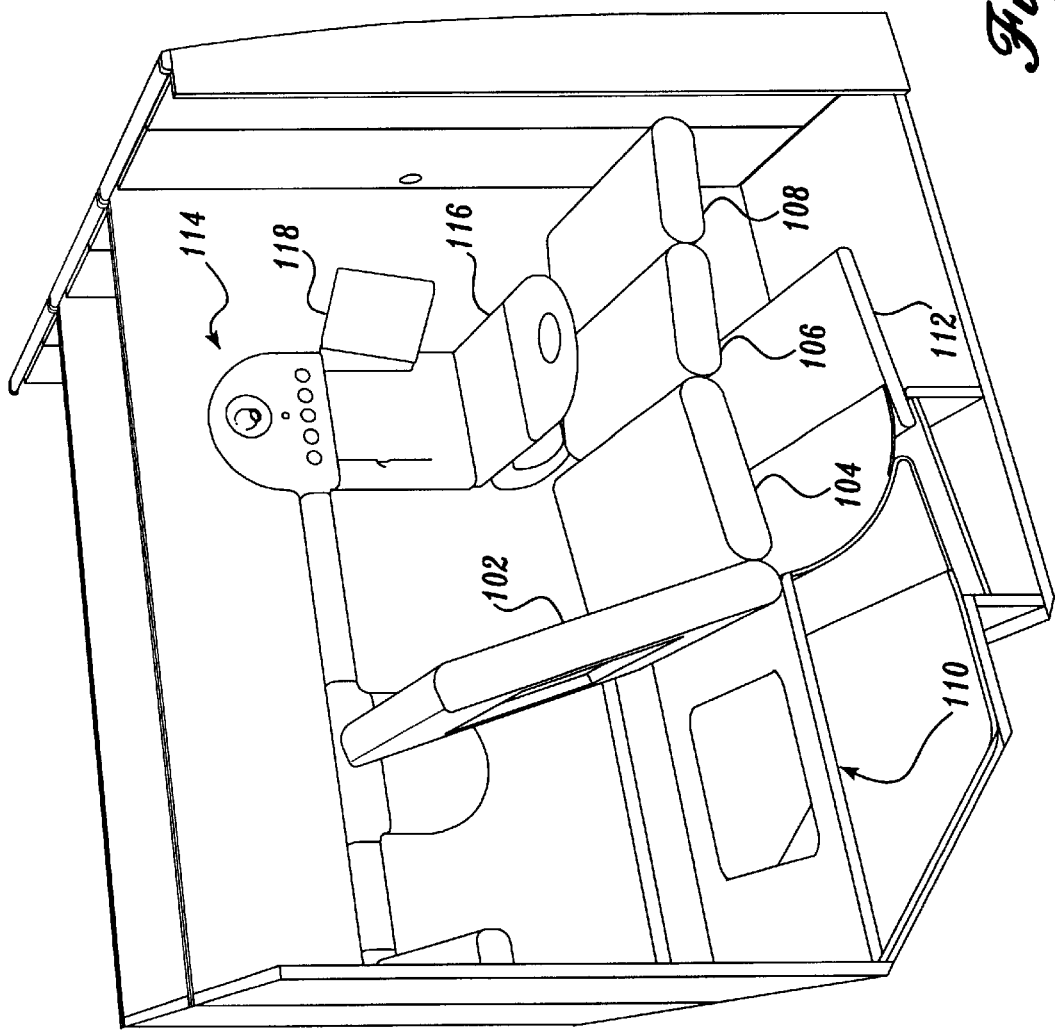
FIG. 23 is a top perspective corresponding to FIG. 22 but with parts in different positions to illustrate a partially reclined configuration.
Figure 24:
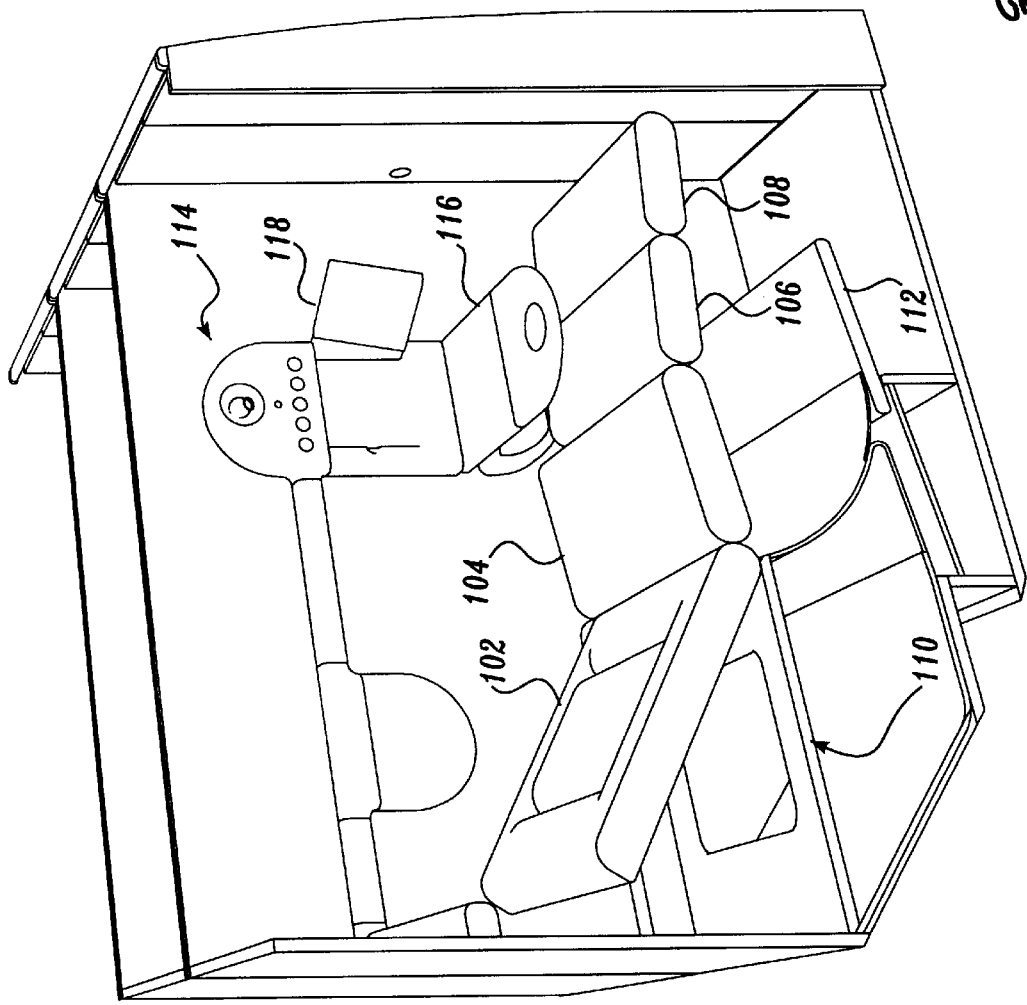
FIG. 24 is a top perspective corresponding to FIGS. 22 and 23 illustrating a more fully reclined configuration.
Figure 25:
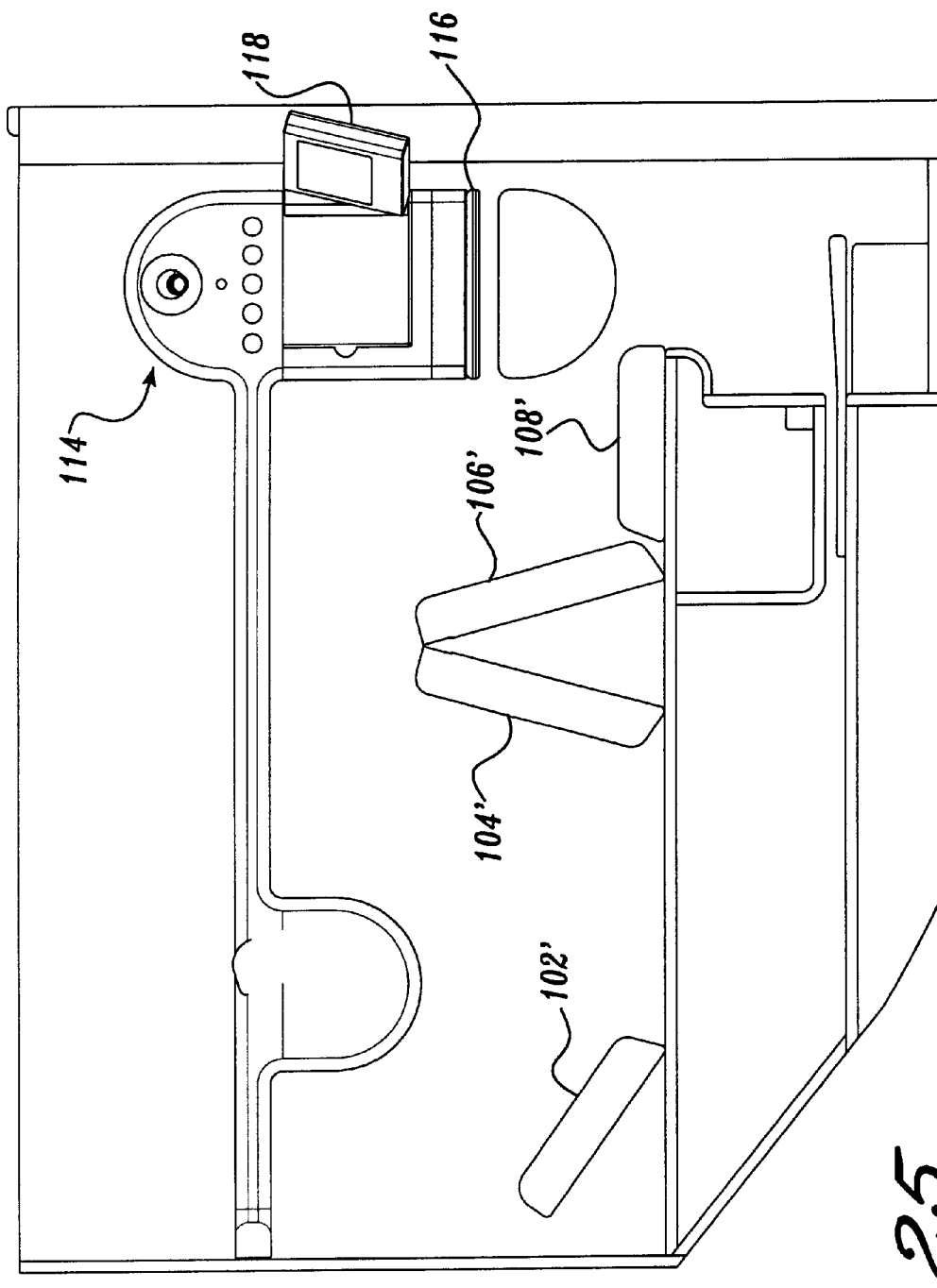
FIG. 25 is a diagrammatic side elevation illustrating an alternative embodiment of a cabin in a sitting configuration.

FIGS. 21–24 illustrate diagrammatically a representative recliner that may be provided in a lower lobe cabin. FIGS. 21 and 22 show the basic components of the recliner, namely, pads 102, 104, 106, and 108, which are supported on frames that are linked together, and with a supporting base structure 110. FIGS. 21 and 22 show the recliner in a sitting configuration, with an extended footrest 112 in front of a lower vertical pad 106. An end pad 108 is folded behind pad 106 and, at the opposite side of pad 106, horizontal pad 104 acts as the seat. The upper end pad 102 is supported in position for a backrest. As best seen in FIG. 22, the cabin can include a side module 114 having a tray or table component 116 and video display 118, both of which can be folded back into the module. Standard aircraft amenities can be provided within the module, including ventilation, reading lights, call buttons, and visual and audible alarms, for example. From the condition shown in FIG. 22, the recliner can be reconfigured to the conditions shown in FIGS. 23 and 24, FIG. 23 showing a raised legrest of aligned pads 106 and 108, and FIG. 25 showing an almost fully recumbent position with backrest 102 reclined. From this position, the backrest can be reclined fully onto its supporting base so that the pads 102–108 extend substantially horizontally for sleeping. Tray or table 116 and video display 118 can be retracted into the module so as not to interfere with the occupant adjusting his or her legs, or for entry into or egress from the cabin.

Figure 26:
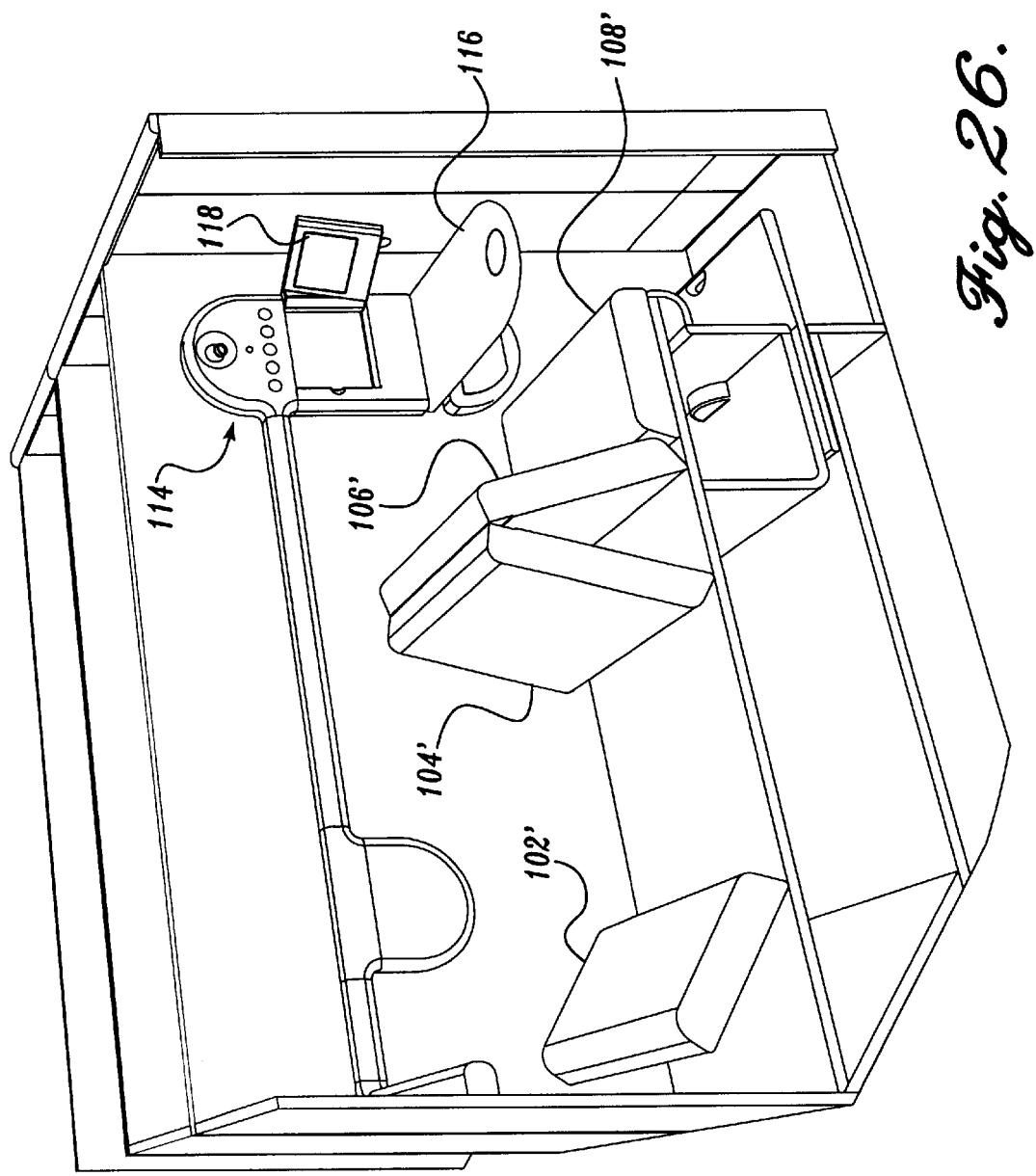
FIG. 26 is a top perspective of the cabin of FIG. 25 illustrating the sitting configuration.
Figure 27:
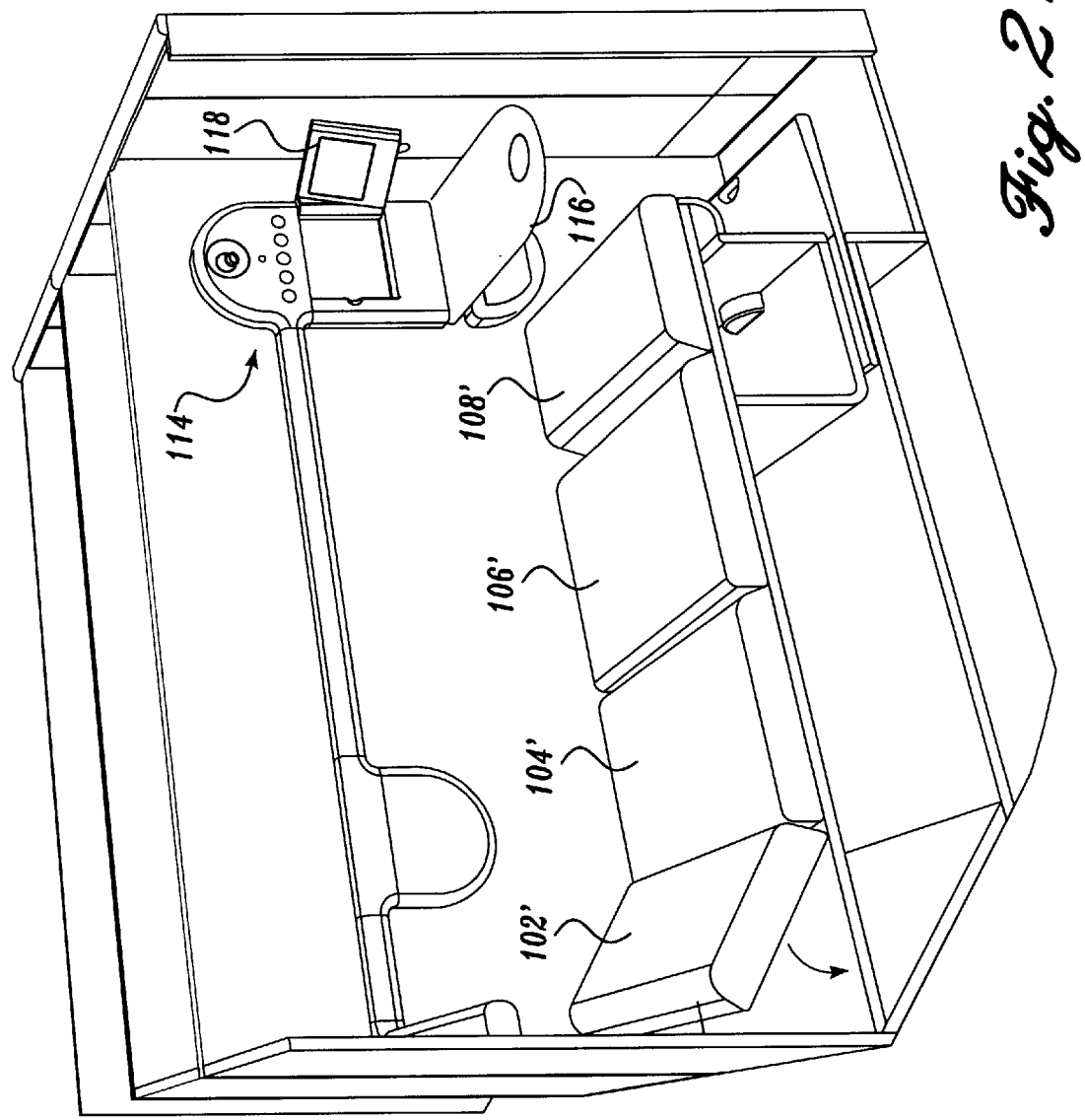
FIG. 27 is a top perspective corresponding to FIG. 26 illustrating an almost fully reclined configuration.

FIGS. 25–27 show another arrangement of pads 102'–108' which can be configured in a sitting position (FIGS. 25 and 26) or fully or partially reclined position (see FIG. 27). Module 114 including tray or table 116 and video display 118 are identical to that described with reference to FIGS. 22–25.

Figure 28:
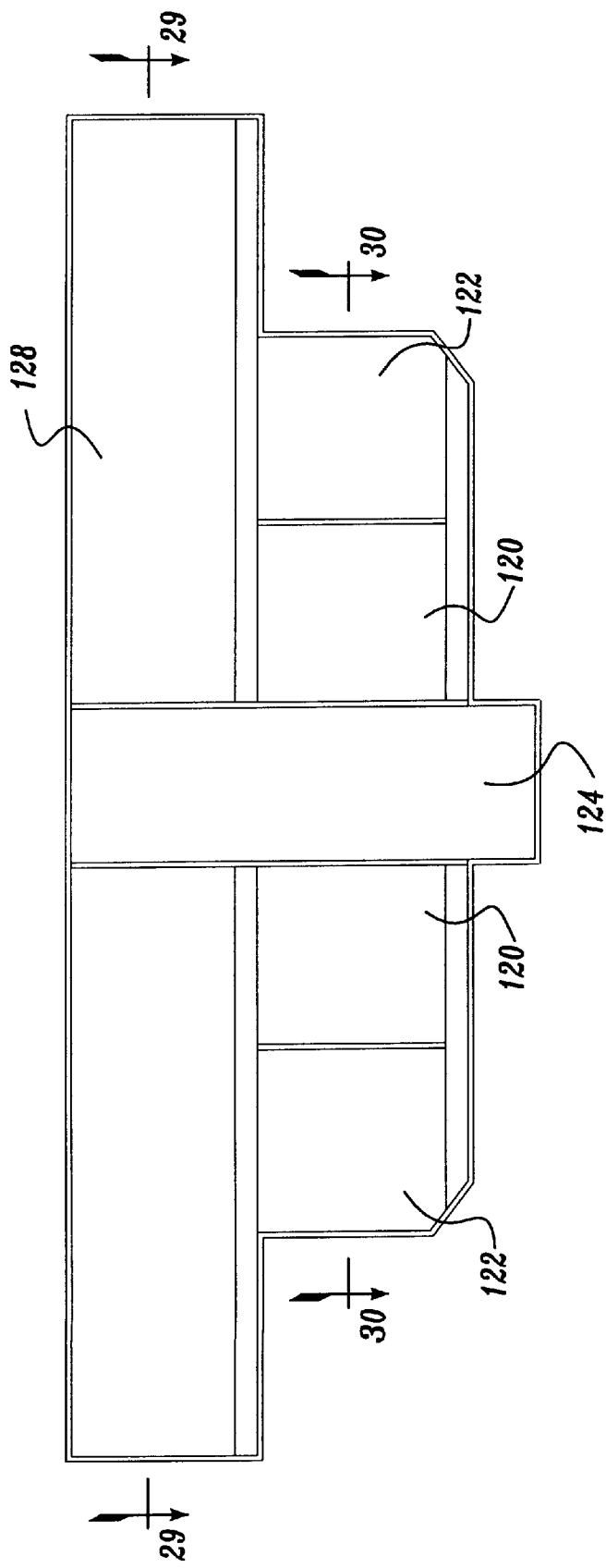
FIG. 28 is a diagrammatic vertical section through the lower portion of an aircraft having another embodiment of a lower lobe sleeping compartment in accordance with the present invention.
Figure 30:
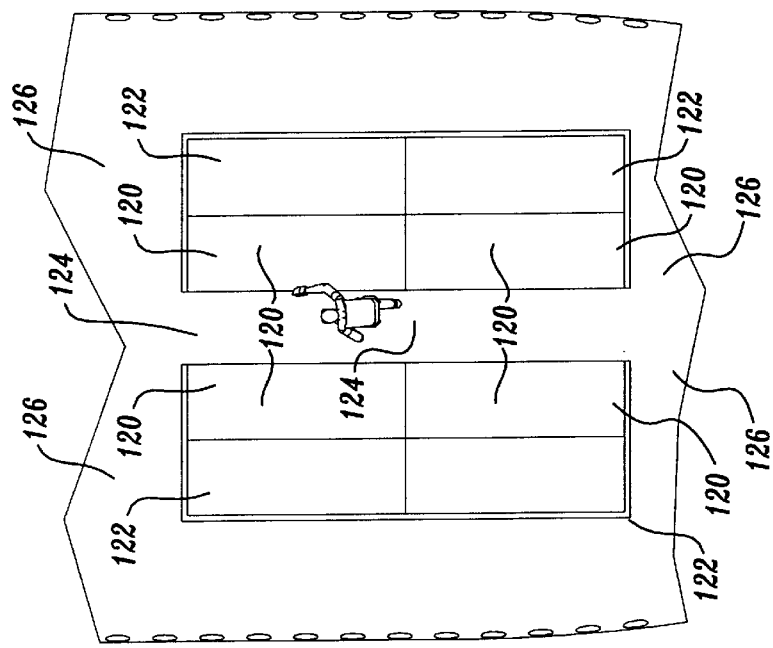
FIG. 30 is a diagrammatic section along line 30—30 of FIG. 28.
Figure 29:
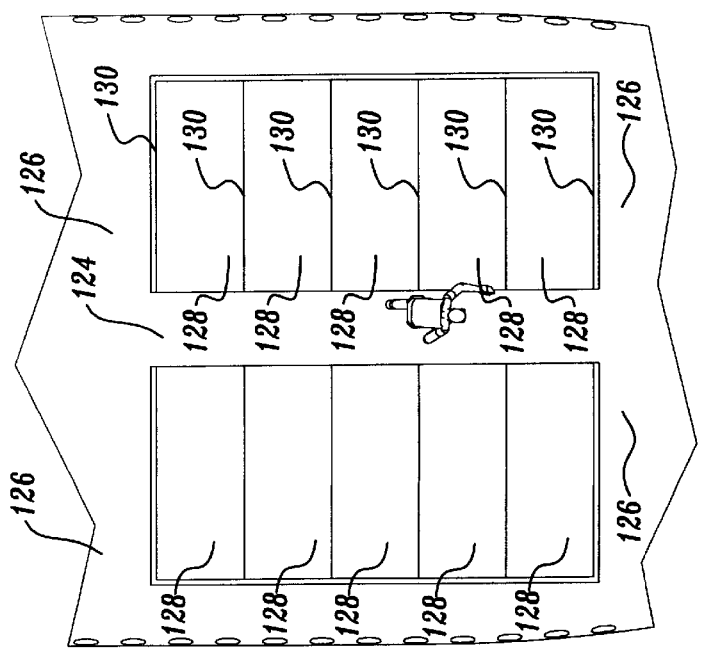
FIG. 29 is a diagrammatic section along line 29—29 of FIG. 28.

In the configuration shown in FIG. 28 through FIG. 30, side-by-side lower bunks 120 and 122 extend longitudinally of the aircraft at both sides of a main aisle 124. Bunks 120 are immediately adjacent to the aisle 124 so that side access may be had to these bunks. The outer bunks 122 have end access at cross aisles 126 provided for this purpose. Upper bunks 128 extend transversely of the aircraft, over the bottom bunks. Oppositely disposed transverse bunks can be used on aircraft having lower lobes configured to accommodate side-by-side LD-1 containers, such as a Boeing 747 or its derivatives. Depending on the available width, units having transversely extending upper bunks may be possible only at one side of the aircraft. With reference to FIG. 29, the upper bunks can each be about 30.5 inches wide by about 79.5 inches long, with privacy walls 130 at the sides and between upper bunks. With reference to FIG. 28, both the upper and lower bunks can have a height of about 25 inches. With reference to FIG. 30, each lower bunk can be about 80 inches long, such that two bunks fit lengthwise beneath a module having five upper bunks. The inboard lower bunks 120 can be about 29 inches wide, whereas the outboard lower bunks 122 can be about 25 inches wide at the bottom and bevel outward to a maximum width of about 38 inches at the top. Another possibility is to provide one or more double-wide bunks at the bottom or at the top. It still is desirable to provide the lowered aisle at the center for increased head room. In a typical embodiment, the aisle will be about 21 inches wide and have head room of about 75 inches.

In all cases, for lower lobe compartments have standard cargo floors (not lowered) conversion time between sleeping compartment and cargo carrying capability can be as short as two or three hours if umbilical type connections and modular containers are used. It is envisioned that the conversion process will take much longer in the lowered floor areas, possibly four to five days.

Individual bunks/sleeping units can be provided with general illumination lights, reading lights, audio and/or audiovisual entertainment, heavy curtains (highly opaque and noise absorbing), small storage spaces for books, shoes and personal items, separate oxygen canisters/masks, smoke detectors, return-to-seat lights, PA speakers, and lapbelt restraints and/or airbags, so that the bunks could continue to be used even during turbulence. Provision can be made for orientation of the aircraft during flight. For example, the aircraft may cruise at a nose-up angle of up to 2.5°. Beds can be angled to accommodate, and/or tapered mattresses can be provided. At least one dressing area should be included, which may be incorporated into the oversize lavatory.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A passenger transport aircraft comprising a fuselage including a main passenger cabin for accommodating seated passengers and a lower lobe beneath the main passenger cabin, a sleeping compartment located in the lower lobe and accessible from the main cabin, the sleeping compartment including a forward area and an aft area, the aircraft having a cargo door for access to the lower lobe adjacent to one of the forward and aft sleeping compartment areas with the other of the forward and aft sleeping compartment areas being remote from such cargo door, the sleeping compartment being convertible between a first configuration in which each of the forward and aft sleeping compartment areas has several beds and an aisle extending substantially longitudinally of the aircraft and a second configuration in which the sleeping compartment area adjacent to the cargo door is modified for accommodating cargo while the sleeping compartment area remote from the cargo door has several beds and an aisle extending substantially longitudinally of the aircraft, and in which the sleeping compartment area adjacent to the cargo door has an unaltered, flat cargo floor for receiving standardized cargo containers in the second configuration, in the first configuration the aisle in the sleeping compartment area adjacent to the cargo door having a first height, and in both the first and second configurations the sleeping compartment area remote from the cargo door having a floor portion in the area of the aisle lowered relative to the unaltered, flat cargo floor of the sleeping compartment area adjacent to the cargo door such that the aisle of the sleeping compartment area remote from the cargo door has a second height greater than the first height.

2. The aircraft defined in claim 1, in which the sleeping compartment includes a pilot/attendant area segregated from a passenger area.

3. A passenger transport aircraft comprising a fuselage including a main passenger cabin for accommodating seated passengers and a lower lobe beneath the main passenger cabin, a sleeping compartment located in the lower lobe and accessible from the main cabin, the sleeping compartment including a forward area and an aft area, the aircraft having a cargo door for access to the lower lobe adjacent to one of the forward and aft sleeping compartment areas with the other of the forward and aft sleeping compartment areas being remote from such cargo door, the sleeping compartment being convertible between a first configuration in which each of the forward and aft sleeping compartment areas has several beds and an aisle extending substantially longitudinally of the aircraft and a second configuration in which the sleeping compartment area adjacent to the cargo door is modified for accommodating cargo while the sleeping compartment area remote from the cargo door has several beds and an aisle extending substantially longitudinally of the aircraft, and in which, in the first configuration, the aisle of the sleeping compartment area adjacent to the cargo door is offset transversely of the aircraft from the aisle of the sleeping compartment area remote from the cargo door.

4. The aircraft defined in claim 3, in which the sleeping compartment includes a plurality of bunk units and at least one cabin having amenities different from the amenities provided for the bunk units.

5. A passenger transport aircraft comprising a fuselage including a main passenger cabin for accommodating seated passengers and a lower lobe beneath the main passenger cabin, a sleeping compartment located in the lower lobe and accessible from the main cabin, the sleeping compartment including a forward area and an aft area, the aircraft having a cargo door for access to the lower lobe adjacent to one of the forward and aft sleeping compartment areas with the other of the forward and aft sleeping compartment areas being remote from such cargo door, the sleeping compartment being convertible between a first configuration in which each of the forward and aft sleeping compartment areas has several beds and an aisle extending substantially longitudinally of the aircraft and a second configuration in which the sleeping compartment area adjacent to the cargo door is modified for accommodating cargo while the sleeping compartment area remote from the cargo door has several beds and an aisle extending substantially longitudinally of the aircraft, and in which, in the second configuration, the sleeping compartment area remote from the cargo door has a front wall, the front wall being removable during conversion from the second configuration to the first configuration for providing access between the forward and aft sleeping compartment areas.

6. The aircraft defined in claim 5, in which the sleeping compartment includes a longitudinal aisle extending substantially the full length of the sleeping compartment, a row of sleeping units disposed longitudinally along one side of the aisleway, and a plurality of sleeping units disposed transversely of the aircraft at the other side of the aisleway.

7. A passenger transport aircraft comprising a fuselage including a main passenger cabin for accommodating seated passengers and a lower lobe beneath the main passenger cabin, a sleeping compartment located in the lower lobe and accessible from the main cabin, the sleeping compartment including a forward area and an aft area, each of the forward and aft sleeping compartment areas having several beds and an aisle extending substantially longitudinally of the aircraft, the aisle of the forward sleeping compartment area being offset transversely of the aircraft relative to the aisle of the aft sleeping compartment area.

8. The aircraft defined in claim 7, in which the aisle of the forward sleeping compartment area has a first height and the aisle of the aft sleeping compartment area has a second height greater than the first height.

9. A passenger transport aircraft comprising a fuselage including a main passenger cabin for accommodating seated passengers and a lower lobe beneath the main passenger cabin, a sleeping compartment located in the lower lobe and accessible from the main cabin, the sleeping compartment including a forward area and an aft area, each of the forward and aft sleeping compartment areas having several beds and an aisle extending substantially longitudinally of the aircraft, the aisle of the forward sleeping compartment area having a floor at a first height and the aisle of the aft sleeping compartment area being lowered relative to the floor of the aisle of the forward sleeping compartment area such that the aisle of the forward sleeping compartment area has a first height and the aisle of the aft sleeping compartment area has a second height greater than the first height.

10. The aircraft defined in claim 9, in which the sleeping compartment includes a pilot/attendant area segregated from a passenger area.

11. The aircraft defined in claim 9, in which the sleeping compartment includes a plurality of bunk units and at least one cabin having amenities different from the amenities provided for the bunk units.

* * * * *